United States Patent
Lin et al.

(10) Patent No.: US 11,129,500 B2
(45) Date of Patent: Sep. 28, 2021

(54) BEVERAGE BREWING APPARATUS

(71) Applicant: CENZ Automation Co. Ltd., Taipei (TW)

(72) Inventors: Chyi-Yeu Lin, Taipei (TW); Jui-Teng Wu, Taichung (TW)

(73) Assignee: CENZ Automation Co. Ltd., New Taipei (TW)

( * ) Notice: Subject to any disclaimer, the term of this patent is extended or adjusted under 35 U.S.C. 154(b) by 594 days.

(21) Appl. No.: 16/111,235

(22) Filed: Aug. 24, 2018

(65) Prior Publication Data

US 2019/0290070 A1    Sep. 26, 2019

(30) Foreign Application Priority Data

Mar. 20, 2018  (TW) ................................ 107109390

(51) Int. Cl.
  *A47J 43/042*  (2006.01)
  *A47J 31/60*  (2006.01)
  *A47J 31/40*  (2006.01)

(52) U.S. Cl.
  CPC ........... *A47J 43/042* (2013.01); *A47J 31/401* (2013.01); *A47J 31/60* (2013.01)

(58) Field of Classification Search
  CPC ......... A47J 31/401; A47J 31/60; A47J 43/042
  USPC ................... 99/280; 222/1, 30, 129.1–129.4, 222/438–440, 146.6, 413, 450; 709/217; 141/1, 82, 83, 9, 94, 95, 103, 104, 100, 141/129, 156, 163, 165, 167, 68, 170, 141/171, 173, 174, 176, 12; 198/349, 198/355, 358, 360, 365, 371
  See application file for complete search history.

(56) References Cited

U.S. PATENT DOCUMENTS 2,146,860 A * 2/1939 Shaw .................... A47J 43/042
                                                                      366/212
3,045,870 A * 7/1962 Danziger .............. A47J 31/405
                                                                      222/644
3,666,558 A * 5/1972 Pryor et al. ............. A47J 31/00
                                                                      134/1

(Continued)

FOREIGN PATENT DOCUMENTS

CN      103640730      3/2014
CN      205388796      7/2016

(Continued)

OTHER PUBLICATIONS

"Office Action of China Counterpart Application", dated Dec. 4, 2020, p. 1-p. 9.

(Continued)

*Primary Examiner* — Dana Ross
*Assistant Examiner* — Ket D Dang
(74) *Attorney, Agent, or Firm* — JCIPRNET

(57) ABSTRACT

A beverage brewing apparatus includes at least one material storing unit, at least one brewing unit, at least one brewing cup and a matching system. The material storing unit is suitable for storing materials. The matching system is suitable for matching the brewing cup and the material storing unit, so that the brewing cup is suitable for receiving materials from the material storing unit. The matching system is suitable for matching the brewing cup and the brewing unit, so that the brewing unit is suitable for brewing materials in the brewing cup.

31 Claims, 18 Drawing Sheets

(56) References Cited

U.S. PATENT DOCUMENTS

| | | | | |
|---|---|---|---|---|
| 8,517,228 | B2* | 8/2013 | Attie | G01F 11/22 222/452 |
| 2012/0285986 | A1 | 11/2012 | Irvin | |
| 2013/0059049 | A1* | 3/2013 | Zhang | A47J 31/4425 426/435 |
| 2015/0164131 | A1* | 6/2015 | Vardakostas | A23P 20/20 99/450.4 |
| 2016/0338525 | A1 | 11/2016 | Fain | |
| 2016/0338526 | A1 | 11/2016 | Nuss | |
| 2018/0344073 | A1* | 12/2018 | Hsu | A47J 31/402 |

FOREIGN PATENT DOCUMENTS

| | | |
|---|---|---|
| CN | 206183035 | 5/2017 |
| CN | 107128517 | 9/2017 |
| CN | 107323743 | 11/2017 |
| CN | 206630460 | 11/2017 |
| CN | 206714622 | 12/2017 |
| CN | 206794313 | 12/2017 |
| CN | 206926937 | 1/2018 |
| CN | 209074222 | 7/2019 |
| EP | 0373126 | 6/1990 |
| EP | 0993801 A1 * | 4/2000 ............ A47J 43/042 |
| EP | 1088504 | 4/2001 |
| EP | 1264567 | 12/2002 |
| JP | 2003237721 | 8/2003 |
| TW | I286066 | 9/2007 |
| TW | M531227 | 11/2016 |
| TW | M547348 | 8/2017 |
| TW | M547930 | 9/2017 |
| TW | M548505 | 9/2017 |
| TW | M549409 | 9/2017 |
| TW | M553976 | 1/2018 |
| TW | M563846 | 7/2018 |
| WO | 2005080199 | 9/2005 |

OTHER PUBLICATIONS

"Office Action of Taiwan Counterpart Application", dated Dec. 13, 2018, p. 1-p. 17.

"Search Report of Europe Counterpart Application", dated Jul. 22, 2019, pp. 1-8.

"Office Action of Taiwan Counterpart Application", dated Sep. 15, 2020, p. 1-p. 7.

* cited by examiner

BEVERAGE BREWING APPARATUS

CROSS-REFERENCE TO RELATED APPLICATION

This application claims the priority benefit of Taiwan application serial no. 107109390, filed on Mar. 20, 2018. The entirety of the above-mentioned patent application is hereby incorporated by reference herein and made a part of this specification.

BACKGROUND OF THE INVENTION

Field of the Invention

The invention relates to a beverage brewing apparatus and particularly relates to an automated beverage brewing apparatus.

Description of Related Art

Modern people are fond of beverages, especially handmade beverages. Handmade beverages are made by adding different solid materials, such as pulps, based on the customers' needs, into liquid materials, for example, water, juice, tea, coffee, milk, etc. Then, by different brewing methods, such as shaking, stirring, and so on, a brewer manually mixes the materials in a brewing cup uniformly. Compared with traditional canned beverages, the advantages of handmade beverages are that customers are able to select adding different solid materials to different liquid materials, and a plurality of brewing methods are provided to brew these materials, providing diversified and customized beverages for customers to opt. Handmade beverages are thus naturally preferred by the public. Especially in summer, almost everyone has one cup of handmade beverage in hand, the popularity of which is seen.

However, compared with traditional canned beverages, automatically massively produced by industrialized process, handmade beverages take up massive manpower and are unable to brew automatically, and are unable to equate with canned beverages in terms of time and cost. Therefore, how to design apparatus automatically brewing handmade beverage to save manpower and time for brewing handmade beverages is an important issue in the field of handmade beverages.

SUMMARY OF THE INVENTION

The invention provides a beverage brewing apparatus, which enhances beverage brewing efficiency, and cuts down on manpower and time costs for beverage preparation.

The beverage brewing apparatus of the invention includes at least one material storing unit, at least one brewing unit, at least one brewing cup and a matching system. The material storing unit is suitable for storing materials. The matching system is suitable for matching the brewing cup and the material storing unit, so that the brewing cup is suitable for receiving the materials from the material storing unit. The matching system is suitable for matching the brewing cup and the brewing unit, so that the brewing unit is suitable for brewing the materials in the brewing cup.

In the embodiment of the invention, the matching system includes a rotary base, the material storing unit is disposed on the rotary base, and the rotary base is suitable for rotating to drive the material storing unit to be aligned with the brewing cup.

In the embodiment of the invention, the beverage brewing apparatus further includes at least one slide rail and a carrier, wherein the carrier is suitable for carrying the cup, and the slide rail is suitable for driving the brewing unit to move, so that the brewing cup on the brewing unit reaches the carrier.

In the embodiment of the invention, the beverage brewing apparatus further includes a preplaced material storing unit and a postplaced material storing unit, wherein the preplaced material storing unit and the postplaced material storing unit are disposed on the carrier and are suitable for storing preplaced materials and postplaced materials respectively. The cup is suitable for receiving the preplaced materials from the preplaced material storing unit, brewed materials from the brewing cup, and the postplaced materials from the postplaced material storing unit in sequence.

In the embodiment of the invention, the beverage brewing apparatus further includes an automatic cup placing unit, wherein the automatic cup placing unit is suitable for loading a plurality of the cups. Each of the cups is suitable for being placed on the carrier from the automatic cup placing unit.

In the embodiment of the invention, the brewing cup is disposed on the brewing unit.

In the embodiment of the invention, the brewing unit includes a shake assembly, and the shake assembly is suitable for shaking the brewing cup.

In the embodiment of the invention, the brewing unit includes a cup lid assembly, and the cup lid assembly is suitable for covering the brewing cup.

In the embodiment of the invention, the beverage brewing apparatus includes a stirring assembly, wherein the stirring assembly is disposed on the cup lid assembly, and is suitable for stirring materials in the brewing cup.

In the embodiment of the invention, the brewing unit includes an overturning assembly, the overturning assembly is suitable for overturning the brewing cup to pour the brewed materials in the brewing cup into a cup.

In the embodiment of the invention, the beverage brewing apparatus further includes at least one washing unit, wherein the brewing unit includes an overturning assembly. The overturning assembly is suitable for overturning the brewing cup to the washing unit. The washing unit is suitable for washing the brewing cup.

In the embodiment of the invention, the matching system includes a conveying device. The conveying device is suitable for conveying the brewing cup, so that the brewing cup passes through the material storing unit.

In the embodiment of the invention, the conveying device is suitable for conveying the brewing cup, so that the brewing cup passes through the brewing unit.

In the embodiment of the invention, the beverage brewing apparatus further includes a carrying unit, wherein the carrying unit is suitable for carrying the brewing cup. The conveying device is suitable for conveying the carrying unit, so that the carrying unit passes through the material storing unit and the brewing unit.

In the embodiment of the invention, the carrying unit includes a cup lid assembly. The cup lid assembly is suitable for covering the brewing cup.

In the embodiment of the invention, the beverage brewing apparatus further includes at least one stop assembly, wherein the stop assembly is movably disposed on conveying path of the conveying device and is suitable for stopping the carrying unit on the conveying path.

In the embodiment of the invention, the beverage brewing apparatus further includes a washing unit, wherein the conveying device is suitable for conveying the brewing cup, so that the brewing cup passes through the washing unit. The washing unit is suitable for washing the brewing cup.

In the embodiment of the invention, the brewing unit includes a gripper. The gripper is suitable for gripping the carrying unit away from the conveying device.

In the embodiment of the invention, the brewing unit includes a stirring assembly. The stirring assembly is suitable for stirring materials in the brewing cup.

In the embodiment of the invention, the brewing cup has an upper opening and a lower opening opposite to each other, and has an upper solenoid valve and a lower solenoid valve respectively located on the upper opening and the lower opening. When the upper solenoid valve is turned on and the lower solenoid valve is turned off, the brewing cup is suitable for receiving the materials from the material storing unit through the upper solenoid valve. When the upper solenoid valve is turned off and the lower solenoid valve is turned on, the brewing cup is suitable for pouring the brewed materials into the cup through the lower opening.

In the embodiment of the invention, the beverage brewing apparatus further includes a washing liquid storing unit, wherein the washing liquid storing unit is suitable for storing washing liquid. When the upper solenoid valve is turned on and the lower solenoid valve is turned on, the washing liquid from the washing liquid storing unit enters the brewing cup through the upper opening and leaves the brewing cup through the lower opening.

In the embodiment of the invention, the beverage brewing apparatus further includes a conveying pipe and an injection portion, wherein the conveying pipe is connected between the brewing cup and the injection portion, and the washing liquid from the washing liquid storing unit is suitable for entering the brewing cup through the injection portion and the conveying pipe in sequence.

In the embodiment of the invention, the beverage brewing apparatus further includes a conveying pipe and an injection portion, wherein the conveying pipe is connected between the brewing cup and the injection portion, and the materials from the material storing unit are suitable for entering the brewing cup through the injection portion and the conveying pipe in sequence.

In the embodiment of the invention, the beverage brewing apparatus further includes a preplaced material storing unit, a postplaced material storing unit and a conveying device, wherein the conveying device is suitable for conveying a cup, so that the cup passes through the preplaced material storing unit, the brewing cup and the postplaced material storing unit in sequence, and the cup is suitable for receiving the preplaced materials from the preplaced material storing unit, the brewed materials from the brewing cup, and the postplaced materials from the postplaced material storing unit in sequence.

In the embodiment of the invention, the beverage brewing apparatus further includes an automatic cup placing unit, wherein the automatic cup placing unit is suitable for loading a plurality of the cups. Each of the cups is suitable for being placed on the conveying device from the automatic cup placing unit.

In the embodiment of the invention, the beverage brewing apparatus further includes at least one stop assembly, wherein the stop assembly is movably configured on the conveying path on the conveying device, and is suitable for stopping the cup on the conveying path.

In the embodiment of the invention, the beverage brewing apparatus further includes a sealing unit, wherein the conveying device is suitable for conveying the cup from the postplaced material storing unit to the sealing unit, and the sealing unit is suitable for sealing the cup.

In the embodiment of the invention, the matching system includes at least one conveying pipe. The conveying pipe is connected between the material storing unit. The materials in the material storing unit are suitable for reaching the brewing cup through the conveying pipe.

In the embodiment of the invention, the material storing unit is located above the brewing cup or below the brewing cup.

In the embodiment of the invention, the brewing unit is integrated with the brewing cup.

In the embodiment of the invention, the beverage brewing apparatus includes a preplaced material storing unit, wherein the preplaced material storing unit is suitable for storing the preplaced material. A cup is suitable for, before receiving the brewed materials from the brewing cup, receiving the preplaced material from the preplaced material storing unit. The beverage brewing apparatus may include a postplaced material storing unit, wherein the postplaced material storing unit is suitable for storing the postplaced material. The cup is suitable for, after receiving the brewed materials from the brewing cup, receiving the postplaced material from the postplaced material storing unit.

Based on the above, the beverage brewing apparatus of the invention matches the material storing unit, the brewing unit, and the brewing cup by the matching system, such that the brewing cup receives materials from the material storing unit or the brewing unit brews materials in the brewing cup, to achieve automatically brewing beverage for saving manpower and time.

To provide a further understanding of the aforementioned and other features and advantages of the disclosure, exemplary embodiments, together with the reference drawings, are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
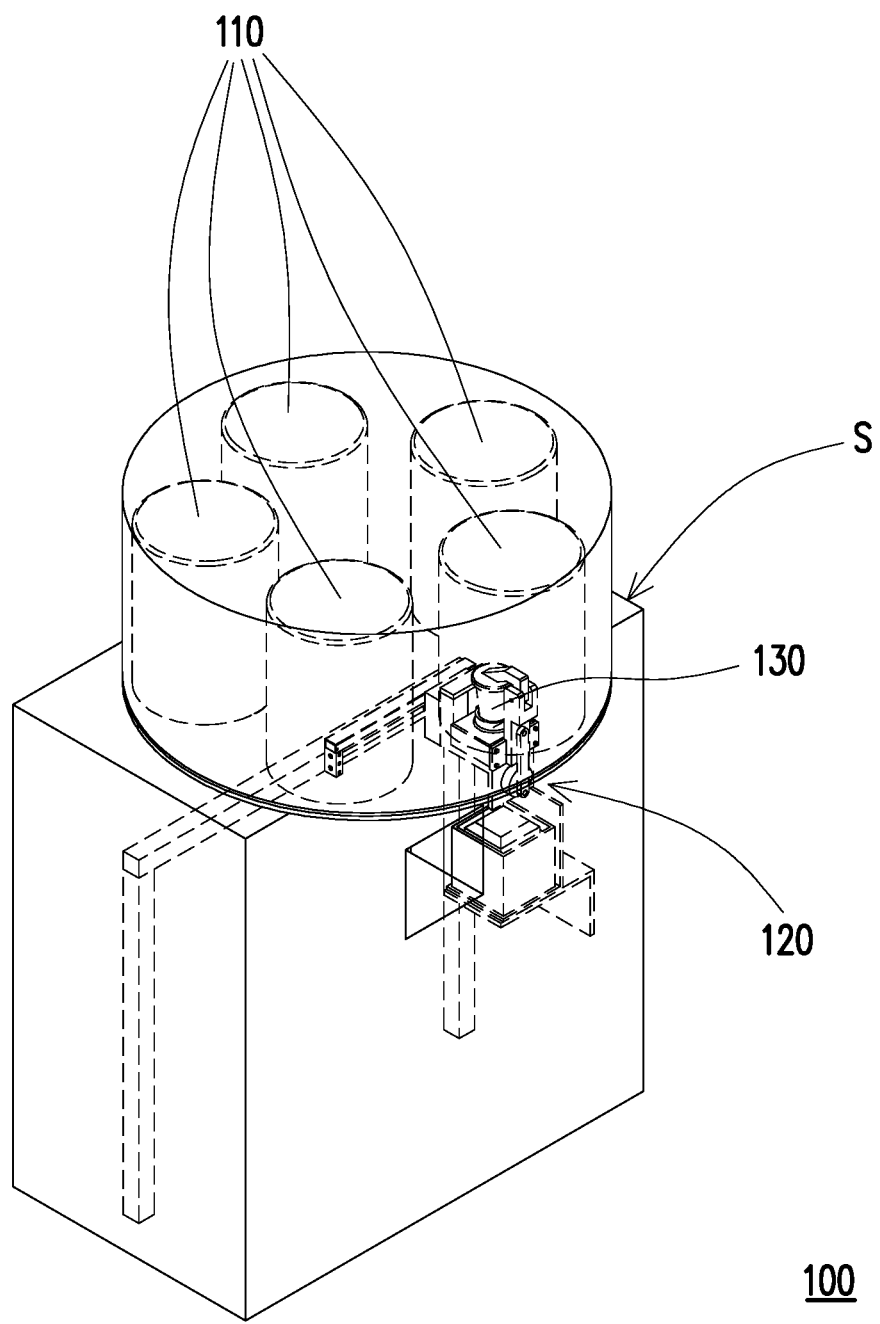
FIG. 1 is a schematic view of the beverage brewing apparatus according to an embodiment of the invention.

FIG. 1 is a schematic view of the beverage brewing apparatus according to an embodiment of the invention. Please refer to FIG. 1. The beverage brewing apparatus 100 of the embodiment includes a plurality of material storing units 110, a brewing unit 120, a brewing cup 130, and a matching system S. The material storing unit 110 is suitable for storing materials. The materials are liquid materials, for example, water, juice, tea, coffee, milk, etc., or solid materials, such as pulps. However, the invention is not limited thereto.

The brewing unit 120 is suitable for steps of stirring, shaking, and rotating the brewed beverage. The brewing cup 130 is suitable for receiving materials from the material storing unit 110, and provides a brewing space for the materials brewed to be beverage. In this embodiment, the brewing cup 130 is a brewing cup, such as a steel cup, a plastic cup, and other kinds of cups alike. However, the invention is not limited thereto.

The matching system S is suitable for matching the brewing cup 130 and the material storing unit 110, and is suitable for matching the brewing cup 130 and the brewing unit 120. Specifically, the user is able to set the matching system S based on needs, so that the matching system S automatically matches the brewing cup 130, the material storing unit 110, and the brewing unit 120. When the steps of brewing beverage proceed to the step of adding certain materials, the matching system S matches the brewing cup 130 and the certain material storing unit 110, so that the brewing cup 130 receives materials from the certain material storing unit 110. When the steps of brewing beverage proceed to the step of brewing beverage, the matching system S matches the brewing cup 130 and the brewing unit 120, so that the materials in the brewing cup 130 are brewed.

According to the above, it is acquired that the beverage brewing apparatus 100 matches the material storing unit 110, the brewing unit 120, and the brewing cup 130 by the matching system S, such that the brewing cup 130 receives materials from the material storing unit 110 or the brewing unit 120 brews the materials in the brewing cup 130, to achieve automatically brewing beverage for saving manpower and time.

Figure 2:
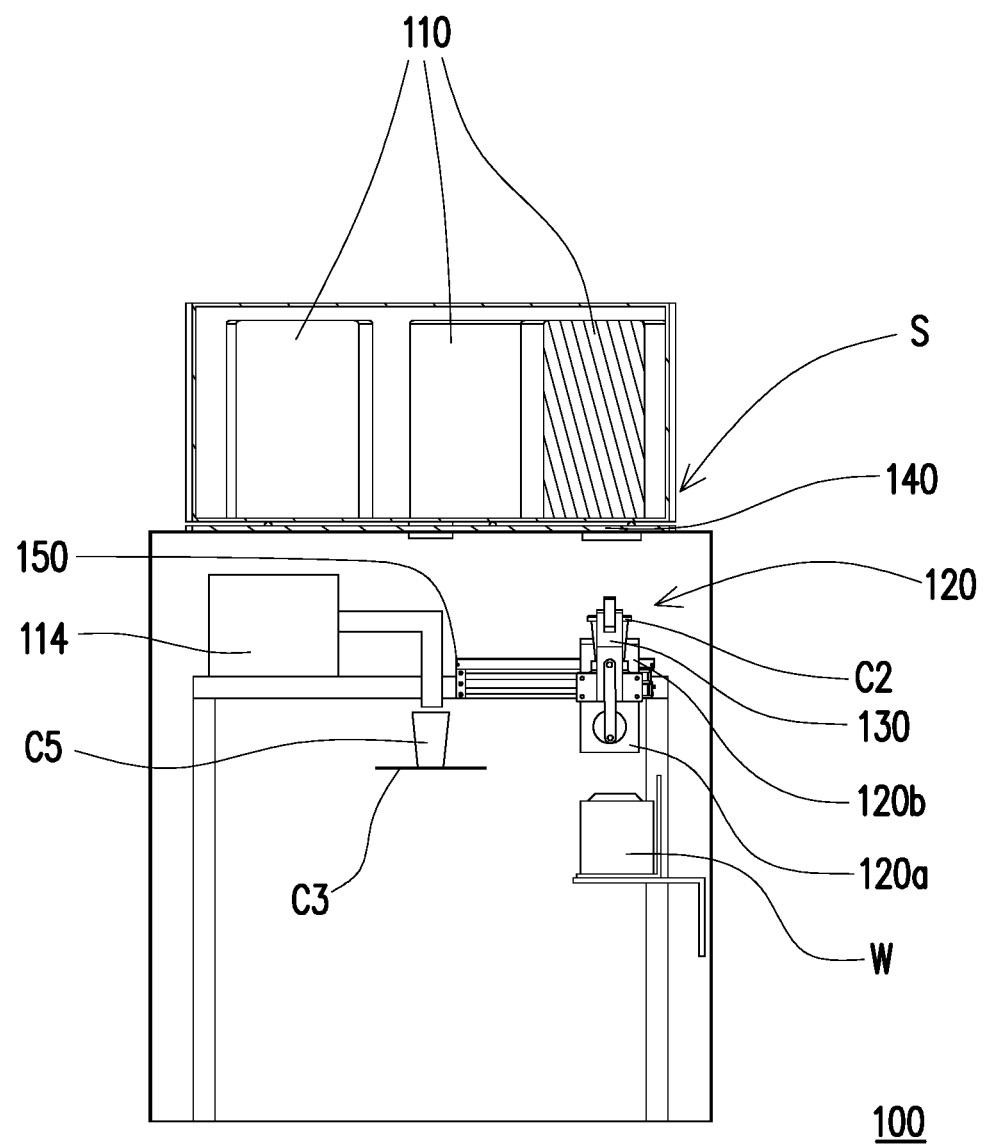
FIG. 2 is a cross-sectional front view of the beverage brewing apparatus of FIG. 1.

The matching system S of the embodiment is suitable for driving the material storing unit 110 and the brewing cup 130 to move relatively to match. The details are described as below. FIG. 2 is a cross-sectional front view of the beverage brewing apparatus of FIG. 1. Please refer to FIG. 2. In this embodiment, the matching system S includes a rotary base 140. The material storing unit 110 is disposed on the rotary base 140. The rotary base 140 is suitable for rotating to drive the material storing unit 110 to be aligned with the brewing cup 130. Furthermore, when the matching system S matches the material storing unit 110, the brewing unit 120, and the brewing cup 130 in accordance with the appropriate steps, the material storing unit 110 adjusts to the appropriate position or switches to a different material storing unit 110 by the rotary base 140.

In this embodiment, the beverage brewing apparatus 100 includes a postplaced material storing unit 114, at least one slide rail 150, a carrier C3, and a cup (beverage cup C5) provided to a customer, wherein the postplaced material storing unit 114 is disposed on the carrier C3 and is suitable for storing the postplaced materials. The beverage cup C5 is suitable for receiving the postplaced material of the postplaced material storing unit 114. By disposing the postplaced material storing unit 114, the beverage brewing apparatus 100 is able to add additional non-brewed materials after completing the brewed materials of the beverage. The brewing unit 120 is disposed on the slide rail 150. The carrier C3 is suitable for carrying the beverage cup C5. The slide rail 150 is suitable for driving the brewing unit 120 to move, so that the brewing cup 130 on the brewing unit 120 reaches the carrier C3. That is, the brewing unit 120, by being driven by the slide rail 150, makes the brewing cup 130 on the brewing unit 120 reach the carrier C3, and makes the brewing cup 130 on the brewing unit 120 return back to material receiving place by being driven by the slide rail 150.

In this embodiment, the brewing unit 120 includes a shake assembly 120a, an overturning assembly 120b and a cup lid assembly C2. The shake assembly 120a is suitable for shaking the brewing cup 130, so that the materials in the brewing cup 130 are thoroughly mixed. The overturning assembly 120b is suitable for overturning the brewing cup 130, and pours the brewed materials in the brewing cup 130 into the beverage cup C5. In addition, the beverage brewing apparatus 100 includes at least one washing unit W. The overturning assembly 120b is suitable for overturning the brewing cup 130 to the washing unit W. The washing unit W is suitable for washing the brewing cup 130. The cup lid assembly C2 is suitable for covering the brewing cup 130 and controls the sealing of the brewing cup 130, so that the brewing cup 130 does not leak the materials in the brewing cup 130 while shaking or rotating. In this embodiment, the amount and the disposition of the material storing unit 110, the brewing unit 120, and the brewing cup 130 are able to be adjusted according to the users' needs. However, the invention is not limited thereto.

In this embodiment, the sequence of beverage brewing is that when the brewing cup 130 receives materials from the material storing unit 110, the cup lid assembly C2 covers the opening of the brewing cup 130 to seal the brewing cup 130. After each of brewing movements of the brewing unit 120, the cup lid assembly C2 removes the opening covered on the brewing cup 130, so that when the brewing cup 130 opens, brewed materials in the brewing cup 130 are poured into the beverage cup C5. At this time, the brewing cup 130 has residue of the brewed materials, by using the washing unit W, the residue of the brewed materials in the brewing cup 130 is removed. The above processes are one cycle of the beverage brewing apparatus brewing beverages of the embodiment. By repeating the above cycle, brewing beverages is able to be repeated.

In another embodiment, the beverage brewing apparatus 100 further includes a preplaced material storing unit 812. The preplaced material storing unit 812 is suitable for storing preplaced materials. The beverage cup C5 is suitable for, before receiving brewed materials of the brewing cup 130, receiving the preplaced materials from the preplaced material storing unit 812, so that it is more flexible to brew beverages. For example, some handmade beverages are added non-brewed materials, for example, pearls, in the beverage cup C5 in advance before brewed materials in the brewing cup 130 are poured into the beverage cup C5 to keep the pearls remain in the bottom of the beverage cup C5. The pearls are the preplaced materials of this embodiment. The beverage brewing apparatus 100 also includes a postplaced material storing unit 814 storing postplaced materials. The beverage cup C5 is suitable for, after receiving brewed materials of the brewing cup, receiving postplaced materials from the postplaced material storing unit 814 to make beverage brewing more diverse. For instance, some handmade beverages, after pouring the brewed beverage into the brewing cup, are further added certain materials to keep them on the top of the beverages, such as milk or condensed milk. The milk or the condensed milk is the postplaced material or this embodiment. In the following embodiments, the preplaced material storing unit 812 and the postplaced material storing unit 814 are able to also be configured as described above, and shall not be repeatedly described.

Other embodiments are listed below for explanation. It should be noted that the embodiments below follow the reference numerals and parts of the aforementioned embodiments, wherein the same reference numerals are used for the same or similar elements, and explanations for the same technical contents are omitted. For the descriptions of the omitted parts, reference may be made to the foregoing embodiment, and will not be repeated in the following embodiments.

Figure 3:
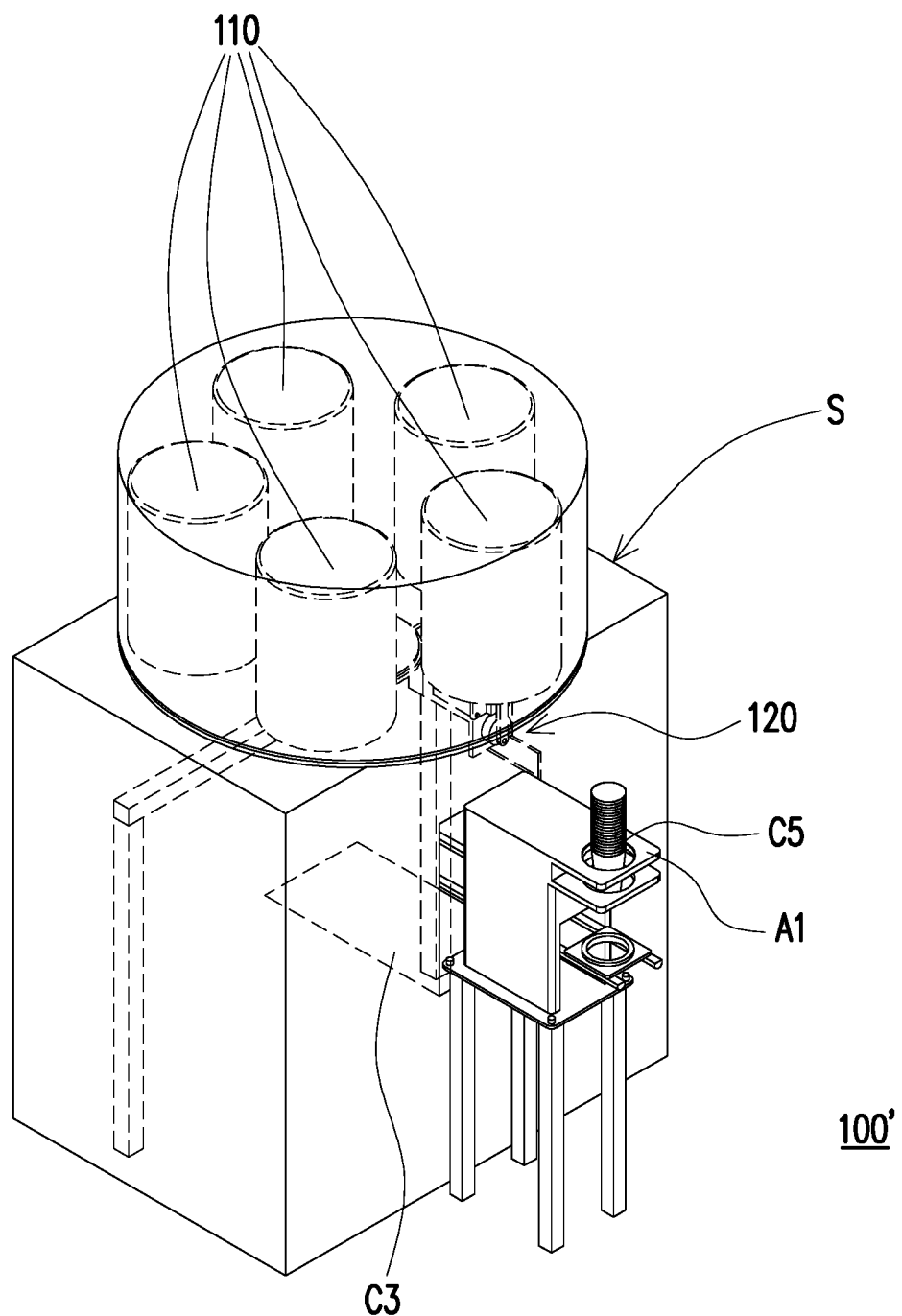
FIG. 3 is a schematic view of the beverage brewing apparatus according to another embodiment of the invention.

FIG. 3 is a schematic view of the beverage brewing apparatus according to another embodiment of the invention. Please refer to FIG. 3. The beverage brewing apparatus 100' is an automatic cup placing unit. The beverage brewing apparatus 100' includes an automatic cup placing unit A1, wherein the automatic cup placing unit A1 is movably disposed on the carrier C3. The automatic cup placing unit A1 is suitable for loading a plurality of the beverage cups C5. Each of the beverage cups C5 is suitable for being placed on the carrier C3 from the automatic cup placing unit A1. After materials are brewed by the beverage brewing apparatus 100', the beverage cup C5 receives brewed materials on the carrier C3.

Figure 4:
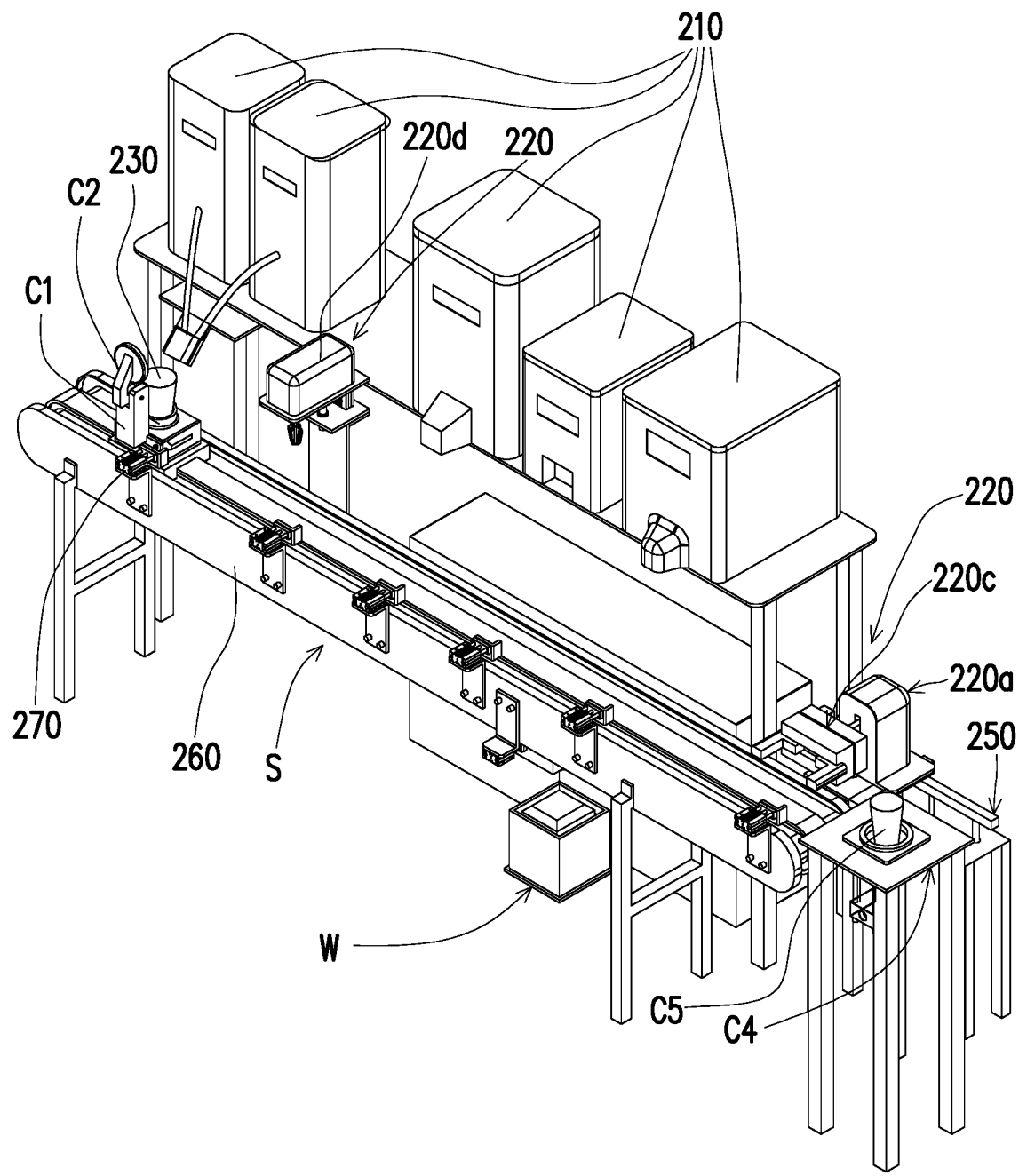
FIG. 4 is a schematic view of the beverage brewing apparatus according to another embodiment of the invention.

FIG. 4 is a schematic view of the beverage brewing apparatus according to another embodiment of the invention. Please refer to FIG. 4. The configuration and effects of the matching system S, a slide rail 250 and the cup lid assembly C2 of FIG. 4 are similar to those of the matching system S, the slide rail 150 and the cup lid assembly C2 of FIG. 1, and shall not be repeated here. The difference between the embodiment illustrated in FIG. 4 and that illustrated in FIG. 1 is that a plurality of material storing units 210 of this embodiment are not disposed on the rotary base 140, but is arranged in a straight line with a plurality of the brewing units 220, wherein the order of a plurality of material storing units 210 and a plurality of the brewing units 220 is determined by beverage brewing steps. However, the invention is not limited thereto.

In this embodiment, the beverage brewing apparatus 200 includes a conveying device 260, a plurality of stop assemblies 270, a carrying unit C1, and a cup holder C4, wherein the conveying device 260 is disposed along the side of the straight line formed by a plurality of material storing units 210 and a plurality of brewing units 220. The carrying unit C1 is suitable for carrying the brewing cup 230. After being matched by the matching system S, the conveying device 260 is suitable for conveying the brewing cup 230 placed on the carrying unit C1, so that the brewing cup 230 passes through the material storing unit 210 and the brewing unit 220, wherein the conveying device 260 is a vertical circular conveyance. That is, when brewing steps are completed, the carrying unit C1 is inverted to the below of the conveying device 260 to convey to the position of the first brewing step in a reverse direction, and further rotates the carrying unit C1 to the above of the conveying device 260, so that the carrying unit C1 recycles. In this embodiment, the conveying unit 260 is a slide rail. Indeed, the conveying device 260 is a belt, a chain, a wheel, or any component that conveys the carrying unit C1. However, the invention is not limited thereto. In this embodiment, a plurality of stop assemblies 270 are movably disposed on the conveying path of the conveying device 260, and are suitable for stopping the carrying unit C1 on the path of the conveying device 260, so that the carrying unit C1 stops on the position of each of the material storing units 210 and the brewing unit 220 corresponding to the conveying device 260, to perform matched brewing steps of the matching system S. The cup holder C4 is suitable for carrying the beverage cup C5.

In this embodiment, the brewing unit 220 further includes a gripper 220c and a stirring assembly 220d. The gripper 220c is suitable for gripping the carrying unit C1 away from the conveying device 260, wherein the gripper 220c has functions of gripping the carrying unit C1 and rotating the carrying unit C1. The gripper 220c provides gripping force so that the shake assembly 220a stably shakes the carrying unit C1. When the materials are fully brewed, the gripper 220c tilts the carrying unit 270, so that brewed materials are poured into the beverage cup C5. The stirring assembly 220d is suitable for stirring materials in the brewing cup.

In this embodiment, the brewing order of beverage brewing is that after the brewing cup 230 receives materials from the material storing unit 210, brewing movements of each of the brewing units 220 are performed, wherein movements of receiving materials and brewing are repeated and interspersed with each other. When the brewing cup 230 performs shaking, the cup lid assembly C2 covers on the opening of the brewing cup 230 to seal the brewing cup 230, shaking is thus performed. When the brewing cup 230 completes shaking, the cup lid assembly C2 removes the opening covered on the brewing cup 230 to open the brewing cup 230, brewed materials in the brewing cup 230 are poured into the beverage cup C5. At this time, the brewing cup 230 has residue of the brewed materials, by using the washing unit W, the residue of the brewed materials in the brewing cup 130 is removed. The above processes complete one cycle of brewing beverage embodiment by the beverage brewing apparatus. By repeating the above cycle, brewing beverages is able to be repeated.

Figure 5:
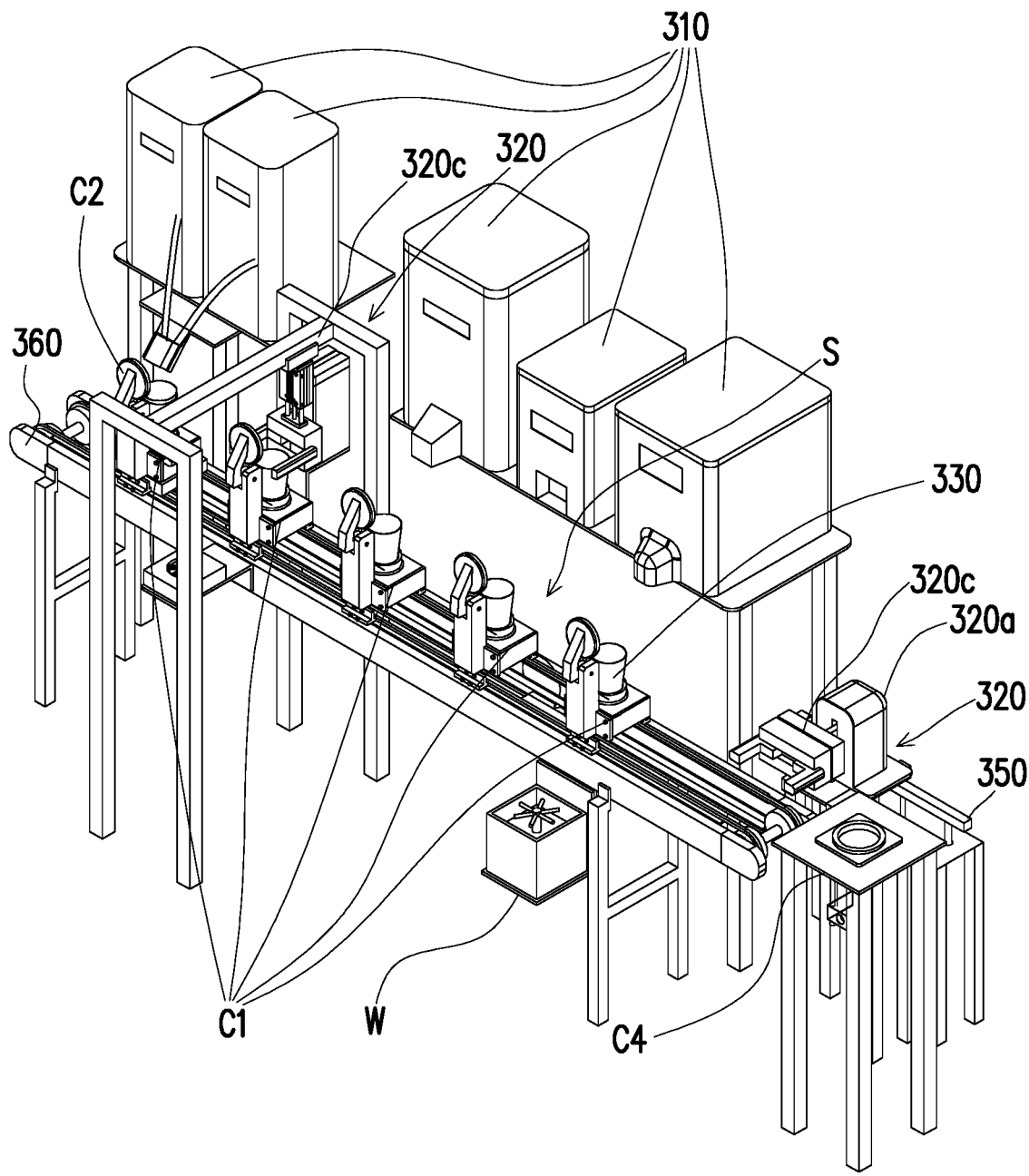
FIG. 5 is a schematic view of the beverage brewing apparatus according to another embodiment of the invention.

FIG. 5 is a schematic view of the beverage brewing apparatus according to another embodiment of the invention. Please refer to FIG. 5. The configuration and effects of the matching system S, a plurality of material storing units 310, a brewing unit 320, a brewing cup 330, a slide rail 350, a conveying device 360, and the cup lid assembly C2 of FIG. 5 are similar to those of the matching system S, a plurality of material storing units 210, the brewing unit 220, the brewing cup 230, the slide rail 250, the conveying device 260 and the cup lid assembly C2 of FIG. 4 and shall not be repeated here. The difference between the embodiment illustrated in FIG. 5 and that illustrated in FIG. 4 is that the beverage brewing apparatus 300 in this embodiment includes a plurality of the brewing cup 330 and a plurality of the carrying unit C1, wherein the beverage brewing apparatus 300 is especially suitable for producing beverage continuously. While the beverage brewing apparatus 300 continuously produces beverages, all the carrying units C1 move and stop simultaneously. Thus, there is no need for the stop assembly 270 to stop each of the carrying unit C1.

Figure 6:
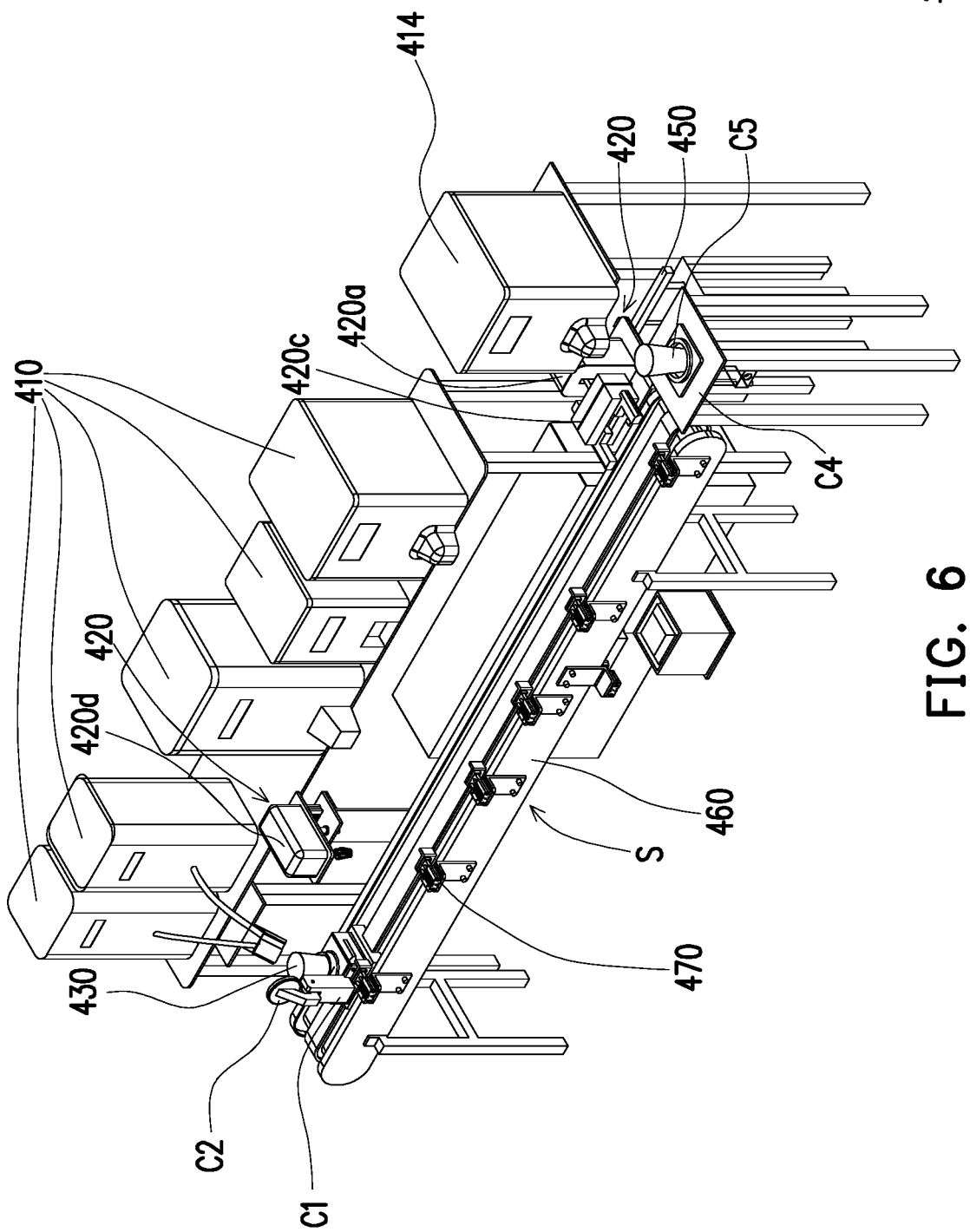
FIG. 6 is a schematic view of the beverage brewing apparatus according to another embodiment of the invention.

FIG. 6 is a schematic view of the beverage brewing apparatus according to another embodiment of the invention. Please refer to FIG. 6. The configuration and effects of the matching system S, a plurality of material storing units 410, a brewing unit 420, a brewing cup 430, a slide rail 450, a conveying device 460, a stop assembly 470, the carrying unit C1 and the cup lid assembly C2 are similar to those of the matching system S, a plurality of material storing units 210, the brewing unit 220, the brewing cup 230, the slide rail 250, the conveying device 260, the stop assembly 270, the carrying unit C1 and the cup lid assembly C2 of FIG. 4, and shall not be repeated here. The difference between the embodiment illustrated in FIG. 6 and that illustrated in FIG. 4 is that the beverage brewing apparatus 400 in this embodiment includes the postplaced material storing unit 414, wherein the postplaced material storing unit 414 is disposed on carrier C3 and is suitable for storing postplaced materials, and the beverage cup C5 is suitable for receiving postplaced materials of the postplaced material storing unit 414. By disposing the postplaced material storing unit 414, the beverage brewing apparatus 400 adds non-brewed materials after completing brewed materials of the beverage.

Figure 7:
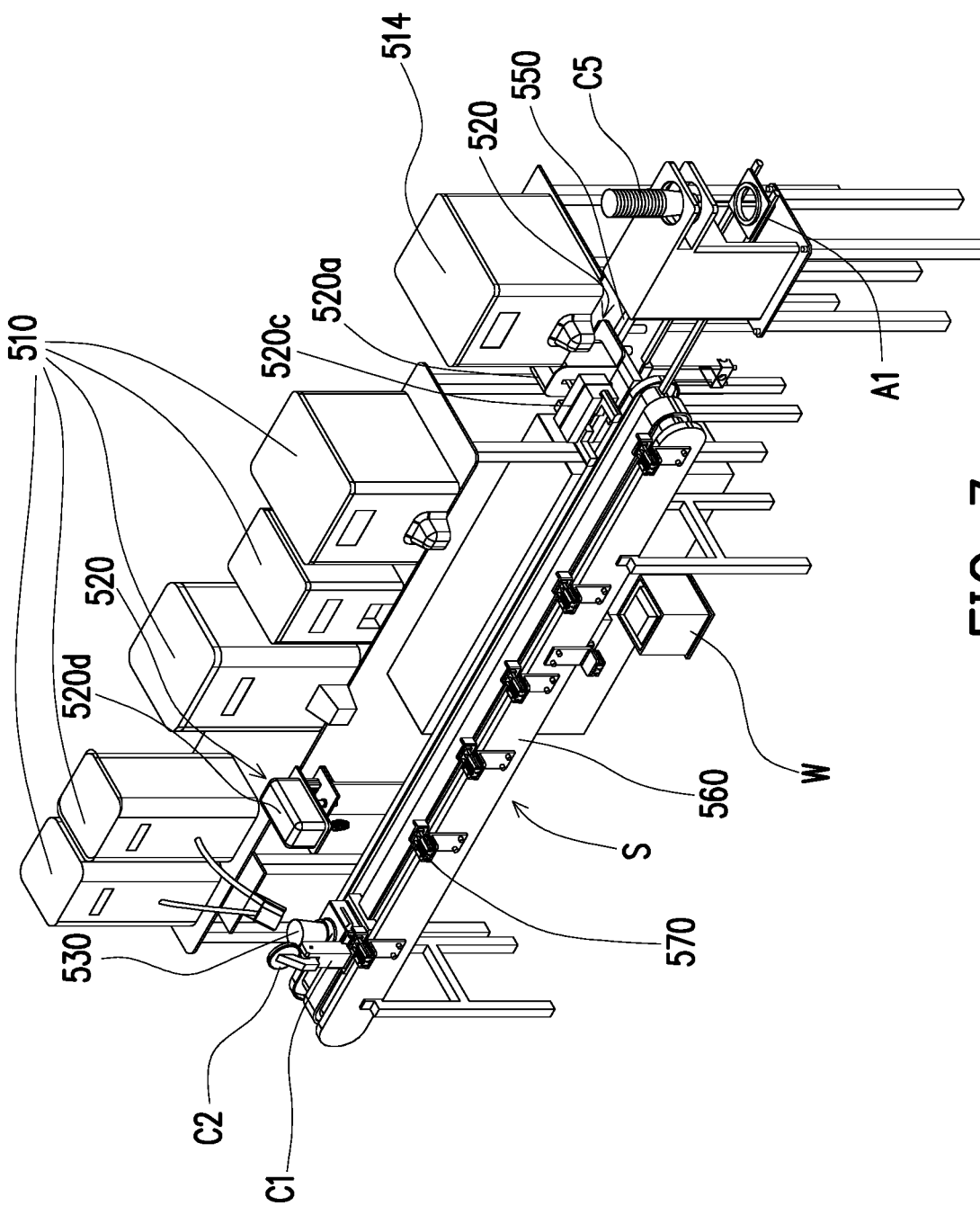
FIG. 7 is a schematic view of the beverage brewing apparatus according to another embodiment of the invention.

FIG. 7 is a schematic view of the beverage brewing apparatus according to another embodiment of the invention. Please refer to FIG. 7. The configuration and effects of the matching system S, a plurality of material storing units 510, a postplaced material storing unit 514, a brewing unit 520, a brewing cup 530, a slide rail 550, a conveying device 560, a stop assembly 570, the carrying unit C1 and the cup lid assembly C2 are similar to those of the matching system S, the plurality of material storing units 410, the postplaced material storing unit 414, the brewing unit 420, the brewing cup 430, the slide rail 450, the conveying device 460, the stop assembly 470, the carrying unit C1 and the cup lid assembly C2 of FIG. 6, and shall not be repeated here. The difference between the embodiment illustrated in FIG. 7 and that illustrated in FIG. 6 is that the beverage brewing apparatus 500 of this embodiment includes the automatic cup placing unit A1, wherein the automatic cup placing unit A1 is suitable for the automatically placing the beverage cup C5. By disposing the automatic cup placing unit A1, the beverage brewing apparatus 500 saves up the movement of the user manually placing the beverage cup C5 on the carrying unit C1, further saving manpower.

Figure 8:
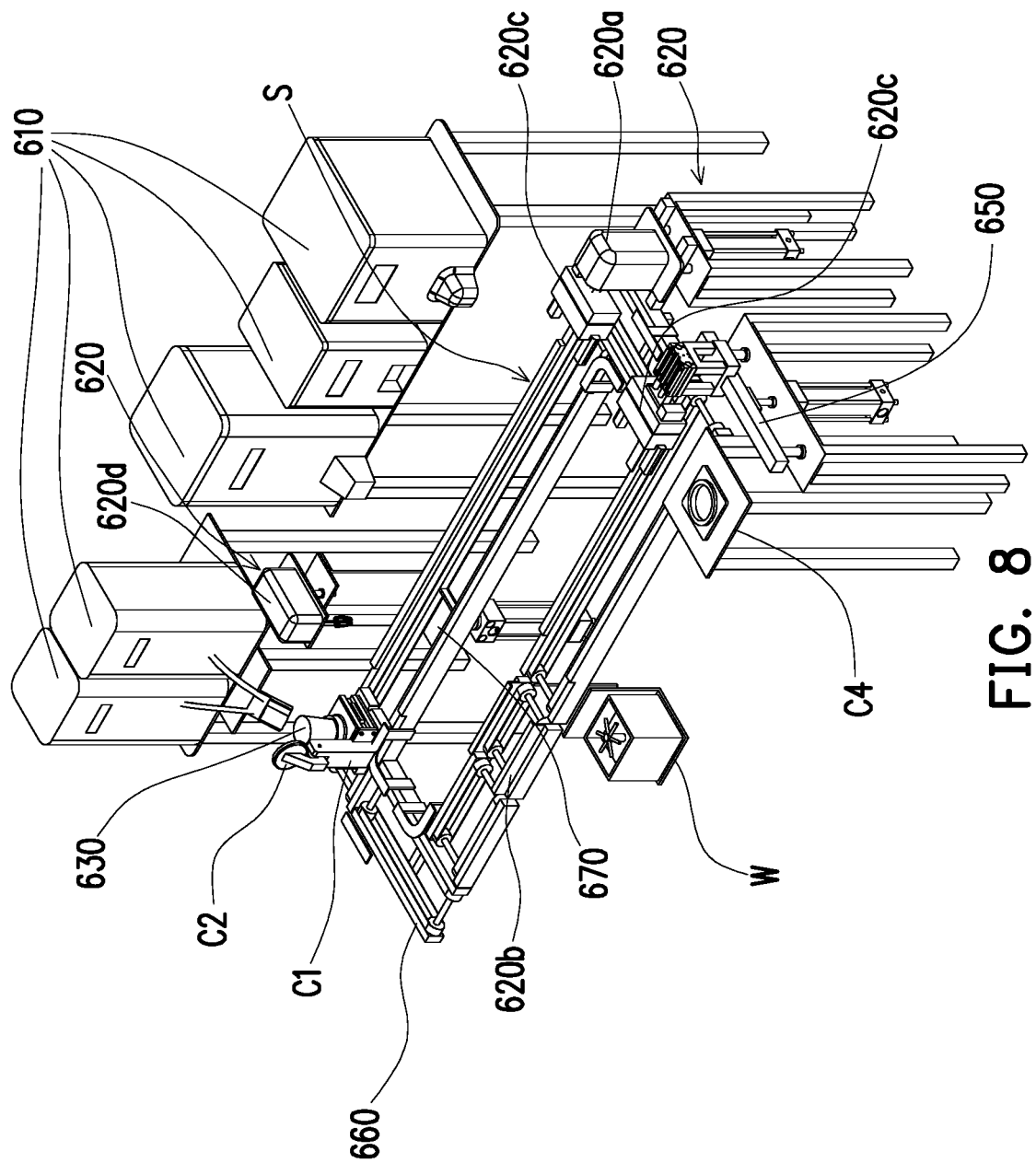
FIG. 8 is a schematic view of the beverage brewing apparatus according to another embodiment of the invention.

FIG. 8 is a schematic view of the beverage brewing apparatus according to another embodiment of the invention. Please refer to FIG. 8. The configuration and effects of the matching system S, a plurality of material storing units 610, a brewing cup 630, a slide rail 650, the carrying unit C1 and the cup lid assembly C2 of FIG. 8 are similar to those of the matching system S, a plurality of material storing units 210, the brewing cup 230, the slide rail 250, the carrying unit C1 and the cup lid assembly C2 of FIG. 4, and shall not be repeated here. The difference between the embodiment illustrated in FIG. 8 and that illustrated in FIG. 4 is that in this embodiment, the beverage brewing apparatus 600 includes an overturning assembly 620b and a plurality of grippers 620c, the conveying device 660 is conveyed by a belt, the stop assembly 670 is suitable for lifting the carrying unit C1 and the brewing cup 630, so that the carrying unit C1 and the brewing cup 630 are not conveyed by the conveying device 660 temporarily to reach the effect of stopping. In this embodiment, since the conveying device 660 is a horizontal belt conveyance, and is unable to directly rotate the carrying unit C1 to the below of conveying device 660 as illustrated in FIG. 4. It is necessary to rotate the carrying unit C1 by the overturning assembly 620b on the washing unit W to wash the brewing cup 630 on the carrying unit C1. In this embodiment, the beverage brewing apparatus 600, by disposing a plurality of grippers 620c, completes more complicated brewing movements, wherein one of the grippers 620c is suitable for shaking the carrying unit C1 and the brewing cup 630 to brew, and the other gripper 620c is suitable for tilting the carrying unit C1 and the brewing cup 630 to pour the brewed materials in the brewing cup 630 into the beverage cup.

Figure 9:
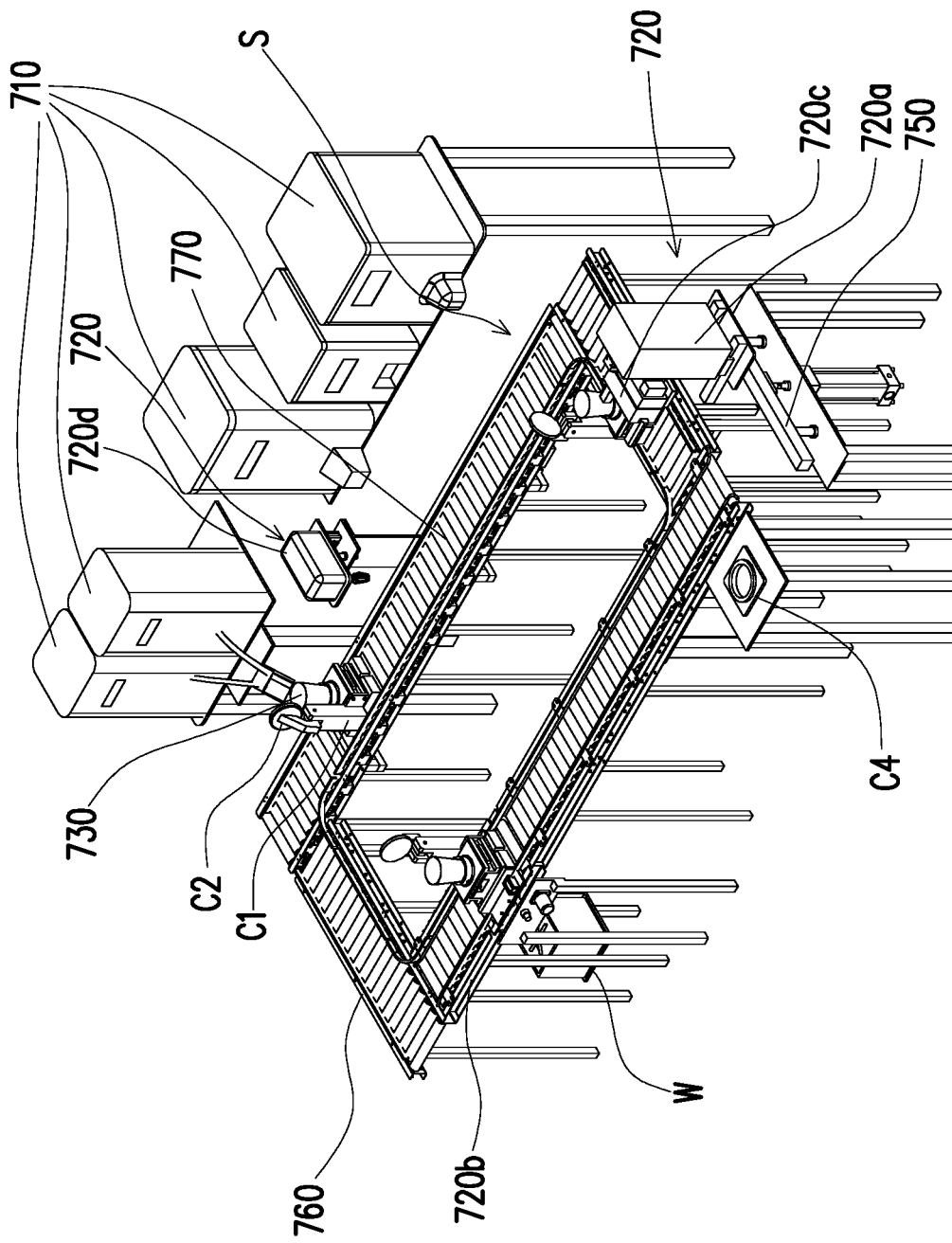
FIG. 9 is a schematic view of the beverage brewing apparatus according to another embodiment of the invention.

FIG. 9 is a schematic view of the beverage brewing apparatus according to another embodiment of the invention. Please refer to FIG. 9. The configuration and effects of the matching system S, a plurality of material storing units 710, a brewing cup 730, a slide rail 750, a stop assembly 770, the carrying unit C1 and the cup lid assembly C2 are similar to those of the matching system S, a plurality of material storing units 610, the brewing cup 630, the slide rail 650, the stop assembly 670, the carrying unit C1 and the cup lid assembly C2, and shall not be repeated here. The difference between the embodiment illustrated in FIG. 9 and that illustrated in FIG. 8 is that the beverage brewing apparatus 400 of this embodiment has only one gripper 720, and the conveying device 760 is a wheel conveyance.

Figure 10:
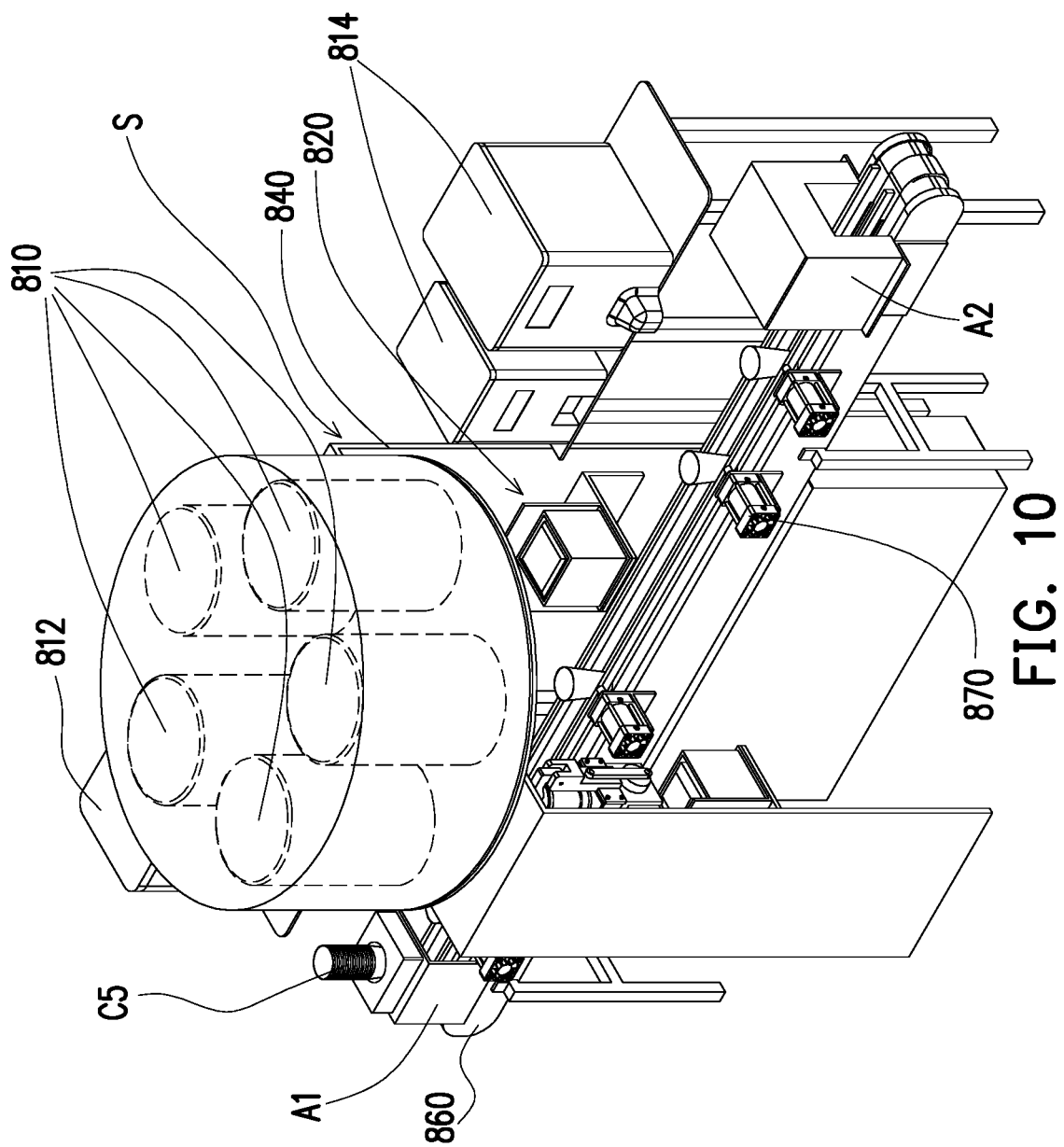
FIG. 10 is a schematic view of the beverage brewing apparatus according to another embodiment of the invention.
Figure 11:
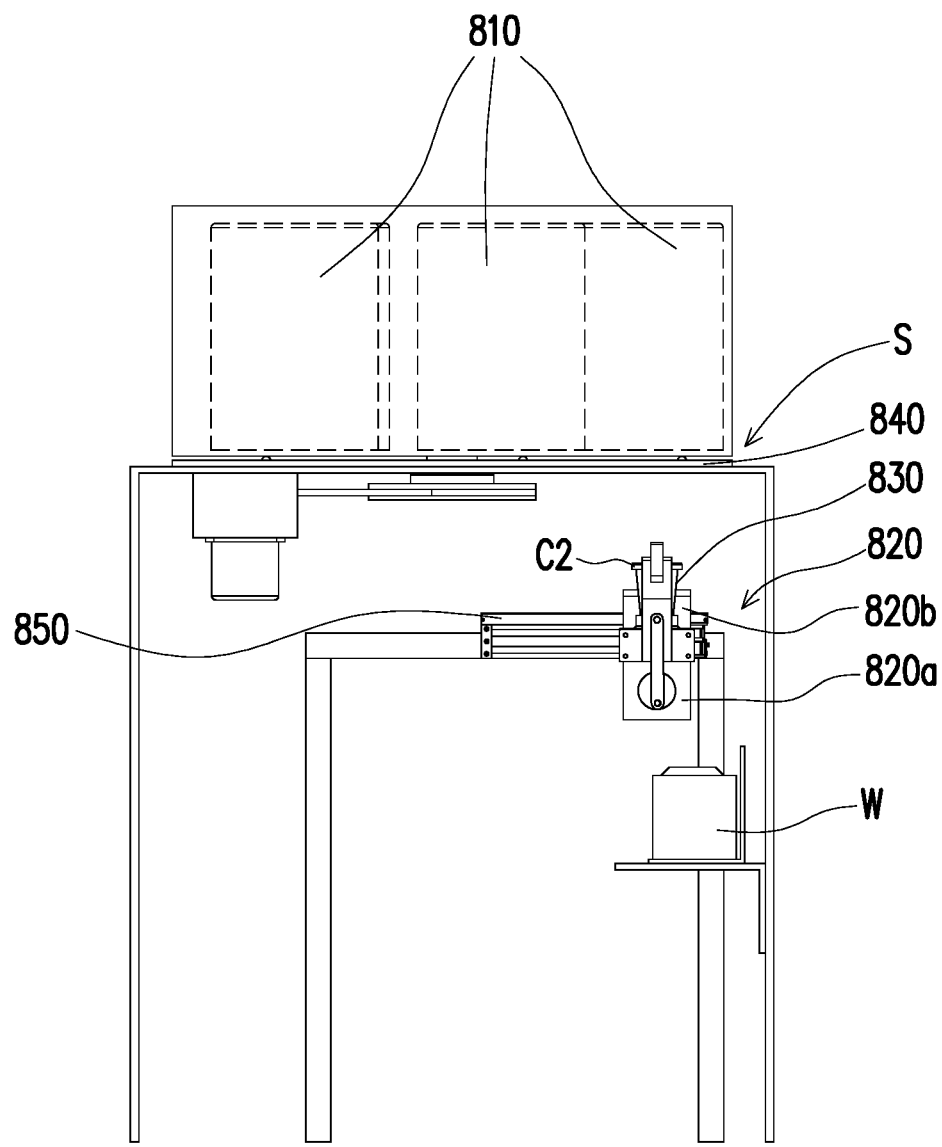
FIG. 11 is a schematic view of some components of the beverage brewing apparatus of FIG. 10.

FIG. 10 is a schematic view of the beverage brewing apparatus according to another embodiment of the invention. FIG. 11 is a schematic view of some components of the beverage brewing apparatus of FIG. 10. Please refer to FIG. 10 and FIG. 11 at the same time. In some components of the beverage brewing apparatus 800, the configuration and effects of the matching system S, a material storing unit 810, a shake assembly 820a, an overturning assembly 820b, a brewing cup 830, a rotary base 840, a slide rail 850, a washing unit W and the cup lid assembly C2 are similar to those of the matching system S, the material storing unit 110, the shake assembly 120a, the overturning assembly 120b, the brewing cup 130, the rotary base 140, the slide rail 150, the washing unit W and the cup lid assembly C2 of FIG. 2, and shall not be repeated here.

In this embodiment, the beverage brewing apparatus 800 includes the preplaced material storing unit 812, the postplaced material storing unit 814, the conveying device 860, the stop assembly 870, the automatic cup placing unit A1 and the sealing unit A2. The preplaced material storing unit 812 and the postplaced material storing unit 814 are disposed on carrier C3 and are suitable for storing preplaced materials and postplaced materials. The beverage cup C5 is suitable for receiving preplaced materials from the preplaced material storing unit 812, brewed materials from the brewing cup 830, and postplaced materials from the postplaced material storing unit 814 in sequence. By disposing the preplaced material storing unit 812, the beverage brewing apparatus 800 adds preplaced materials before brewing beverages. Besides, by disposing the postplaced material storing unit 814, the beverage brewing apparatus 800 adds additional materials after completing main content of beverages. The automatic cup placing unit A1 is suitable for automatically placing the beverage cup C5 by disposing the automatic cup placing unit A1. The beverage brewing apparatus 800 saves up the movement of the user manually placing the beverage cup C5 on the carrying unit C1. The conveying device 860 is suitable for conveying the beverage cup C5 from the postplaced material storing unit 814 to the sealing unit A2. A plurality of stop assemblies 870 is movably disposed on the conveying path of the conveying device 860, and is suitable for stopping the beverage cup C5 on the conveying path of the conveying device 860, so that the beverage cup C5 stops on the conveying path of the conveying device 860, and is suitable for receiving the brewed materials from the brewing cup 830. The sealing unit A2 is suitable for sealing the beverage cup C5, by disposing the sealing unit A2. The beverage brewing apparatus 800 saves up the movement of the user manually sealing the beverage cup C5 on the carrying unit C1, further saving manpower.

Figure 12:
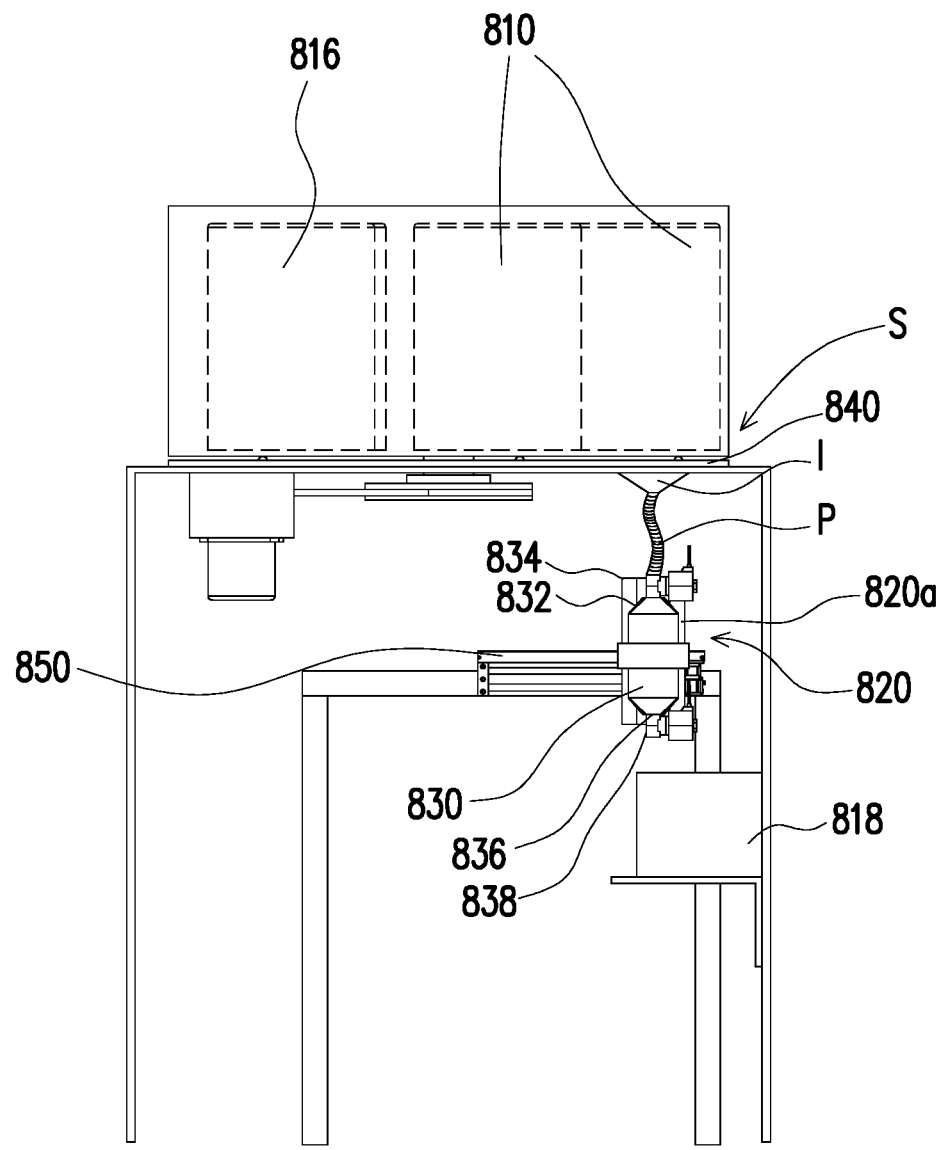
FIG. 12 is a schematic view of another embodiment of some components of the beverage brewing apparatus of FIG. 10.

FIG. 12 is a schematic view of another embodiment of some components of the beverage brewing apparatus of FIG. 10. Please refer to FIG. 12. In some components of the beverage brewing apparatus 800, the configuration and effects of the matching system S, the material storing unit 810, the shake assembly 820a, the rotary base 840 and the slide rail 850 are similar to those of the matching system S, the material storing unit 810, the shake assembly 820a, the rotary base 840 and the slide rail 850 of FIG. 11, and shall not be repeated here. The difference between the embodiment illustrated in FIG. 12 and that illustrated in FIG. 11 is that in this embodiment, the matching system S includes a conveying pipe P, an injection portion I. The conveying pipe P is connected between the material storing unit 810 and the injection portion I. The materials in the material storing unit 810 are suitable for reaching the injection portion I through the conveying pipe P. The brewing cup 830 is suitable for receiving materials from the injection portion I. The brewing cup 830 includes an upper opening 832, an upper solenoid valve 834, a lower opening 836 and a lower solenoid valve 838. When the upper solenoid valve 834 is turned on and the lower solenoid valve 838 is turned off, the brewing cup 830 is suitable for receiving the materials from the material storing unit 810 through the upper solenoid valve 832. When the upper solenoid valve 834 is turned off and the lower solenoid valve 838 is turned on, the brewing cup 830 is suitable for pouring the brewed materials into the beverage cup C5 through the lower opening 836. The brewing cup 830, by the upper solenoid valve 834 and the lower solenoid valve 838, precisely control its sealing, so that while the brewing cup 830 performs the step of shaking, the materials in the brewing cup 830 are not leaked.

In this embodiment, the washing liquid storing unit 816 is disposed on the rotary base 840, wherein the washing liquid storing unit 816 is suitable for storing washing liquid. When the brewing cup 830 pours brewed materials into the beverage cup C5, the washing liquid storing unit 816, by the rotary base 840, is switched to the position of the injection portion I. In addition, when the upper solenoid valve 834 is turned on and the lower solenoid valve 838 is turned on, the washing liquid from the washing liquid storing unit enters the brewing cup through the upper opening 832 and leaves the brewing cup through the lower opening 836. Some components of the beverage brewing apparatus 800 include a liquid waste collection unit 818. The liquid waste collection unit 818 disposed on the lower opening 836 is suitable for, after completing washing the brewing cup 830, receiving the liquid waste of the washed brewing cup 830.

Figure 13:
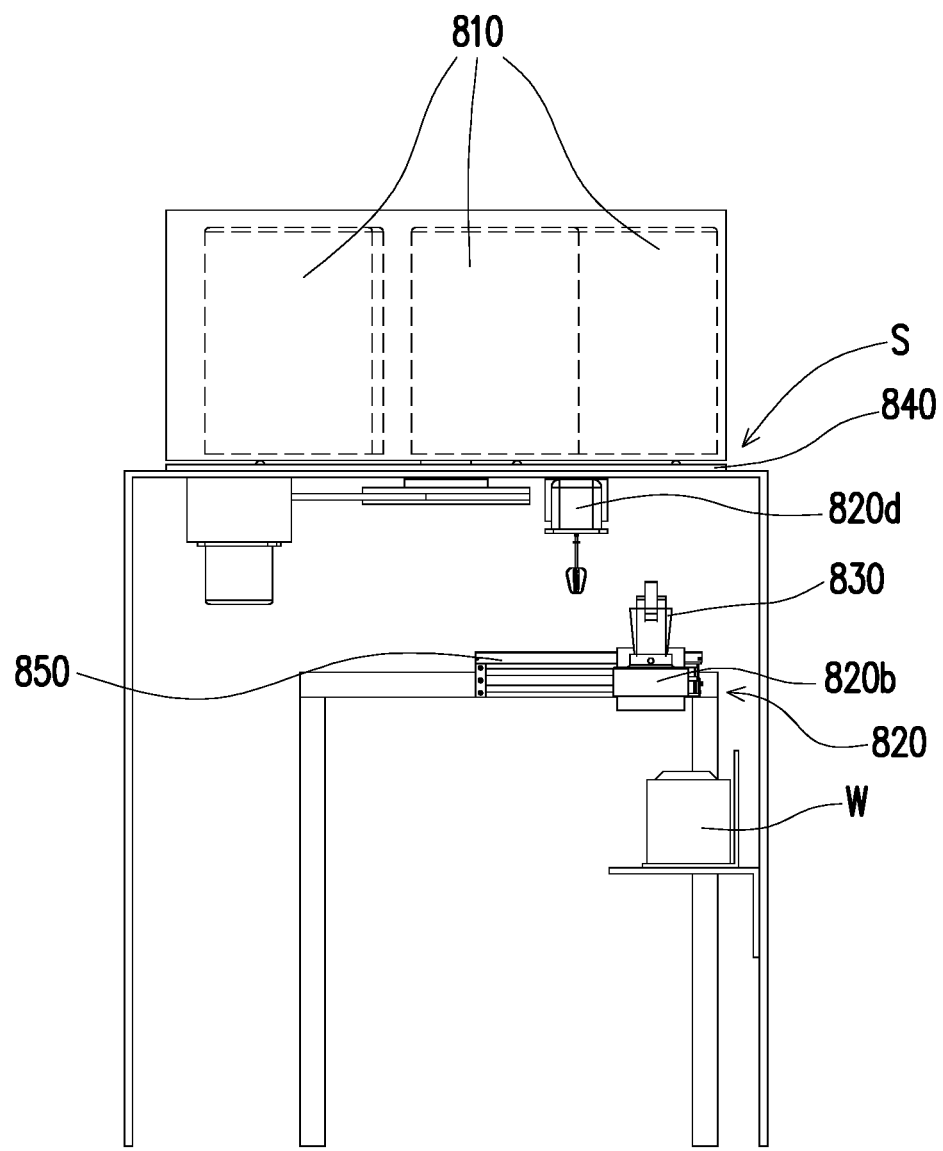
FIG. 13 is a schematic view of another embodiment of some components of the beverage brewing apparatus of FIG. 10.

FIG. 13 is a schematic view of another embodiment of some components of the beverage brewing apparatus of FIG. 10. Please refer to FIG. 13. In some components of the beverage brewing apparatus 800, the configuration and effects of the matching system S, the material storing unit 810, the overturning assembly 820b, the brewing cup 830, the rotary base 840, the slide rail 850 and the washing unit W are similar to those of FIG. 11, and shall not be repeated here. The difference between the embodiment illustrated in FIG. 13 and that illustrated in FIG. 11 is that, in this embodiment, some components of the beverage brewing apparatus 800 includes a stirring assembly 820d. The beverage brewing apparatus 800 stirs materials by the stirring assembly 820d, then rotates the carrying unit C1 by the overturning assembly 820b, and pours the brewed materials in the brewing cup 830 into the beverage cup.

Figure 14:
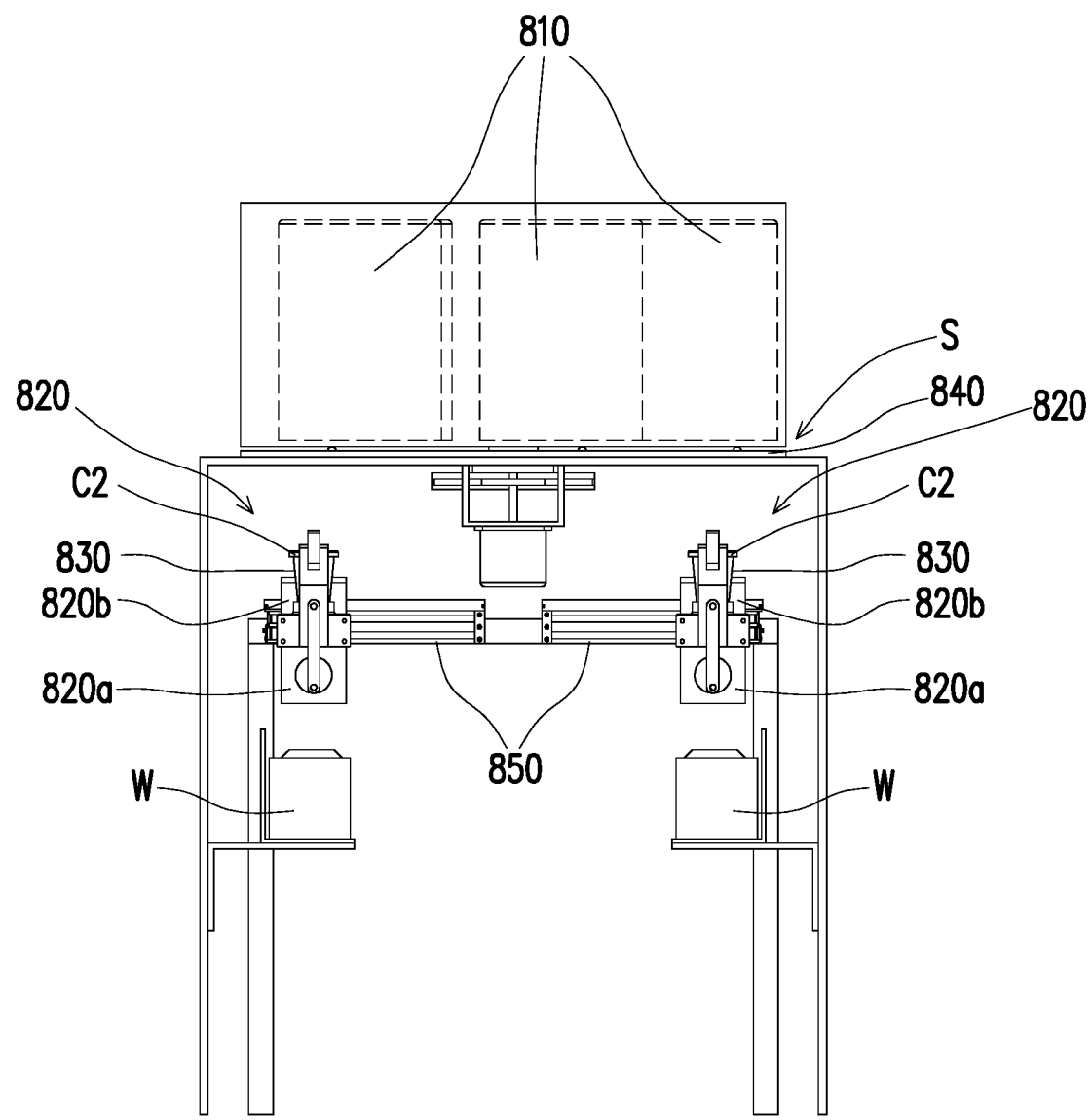
FIG. 14 is a schematic view of another embodiment of some components of the beverage brewing apparatus of FIG. 10.

FIG. 14 is a schematic view of another embodiment of some components of the beverage brewing apparatus of FIG. 10. Please refer to FIG. 14. In some components of the beverage brewing apparatus 800, the configuration and effects of the matching system S, the material storing unit 810, the shake assembly 820a, the overturning assembly 820b, the brewing cup 830, the rotary base 840, the slide rail 850, the washing unit W and the cup lid assembly C2 are similar to those of FIG. 11, and shall not be repeated here. The difference between the embodiment illustrated in FIG. 14 and that illustrated in FIG. 11 is that, in this embodiment, some components of the beverage brewing apparatus 800 includes a plurality of brewing units 820. The beverage brewing apparatus 800 brews materials in a plurality of the brewing cups 830 at the same time by a plurality of the brewing units 820, and saves beverage brewing time.

Figure 15:
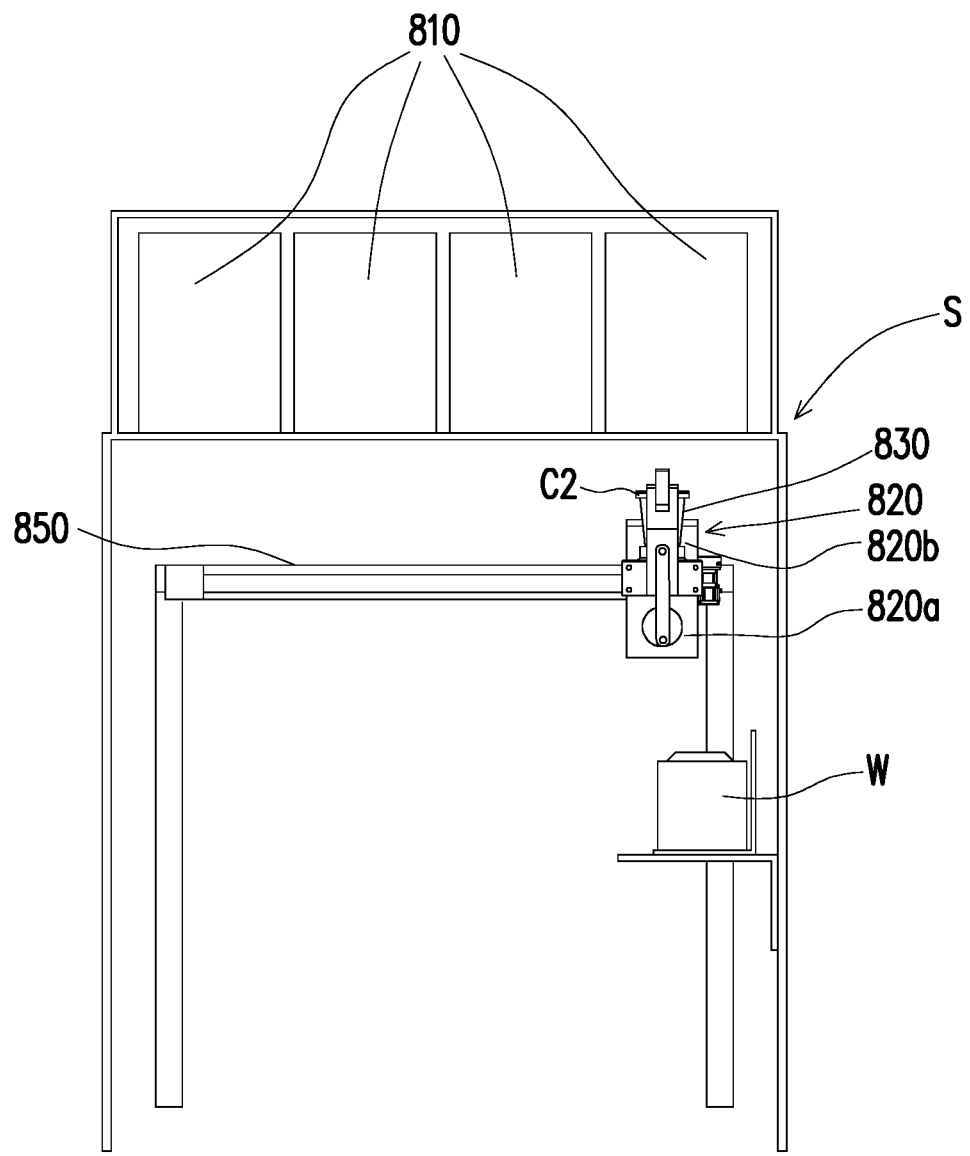
FIG. 15 is a schematic view of another embodiment of some components of the beverage brewing apparatus of FIG. 10.

FIG. 15 is a schematic view of another embodiment of some components of the beverage brewing apparatus of FIG. 10. Please refer to FIG. 15. In some components of the beverage brewing apparatus 800, the configuration and effects of the beverage brewing apparatus 800, the matching system S, the shake assembly 820a, the overturning assembly 820b, the brewing cup 830, the slide rail 850, the washing unit W and the cup lid assembly C2 are similar to those of FIG. 11, and shall not be repeated here. The difference between the embodiment illustrated in FIG. 15 and that illustrated in FIG. 11 is that, in this embodiment, the material storing device 810 in some components of the beverage brewing apparatus 800 is a vertical arranged and is disposed above the conveying device 860. By the above-mentioned arrangement of the material storing device 810, the matching system S directly matches the brewing cup 830 through the slide rail 850 to different material storing devices 810 to receive materials.

Figure 16:
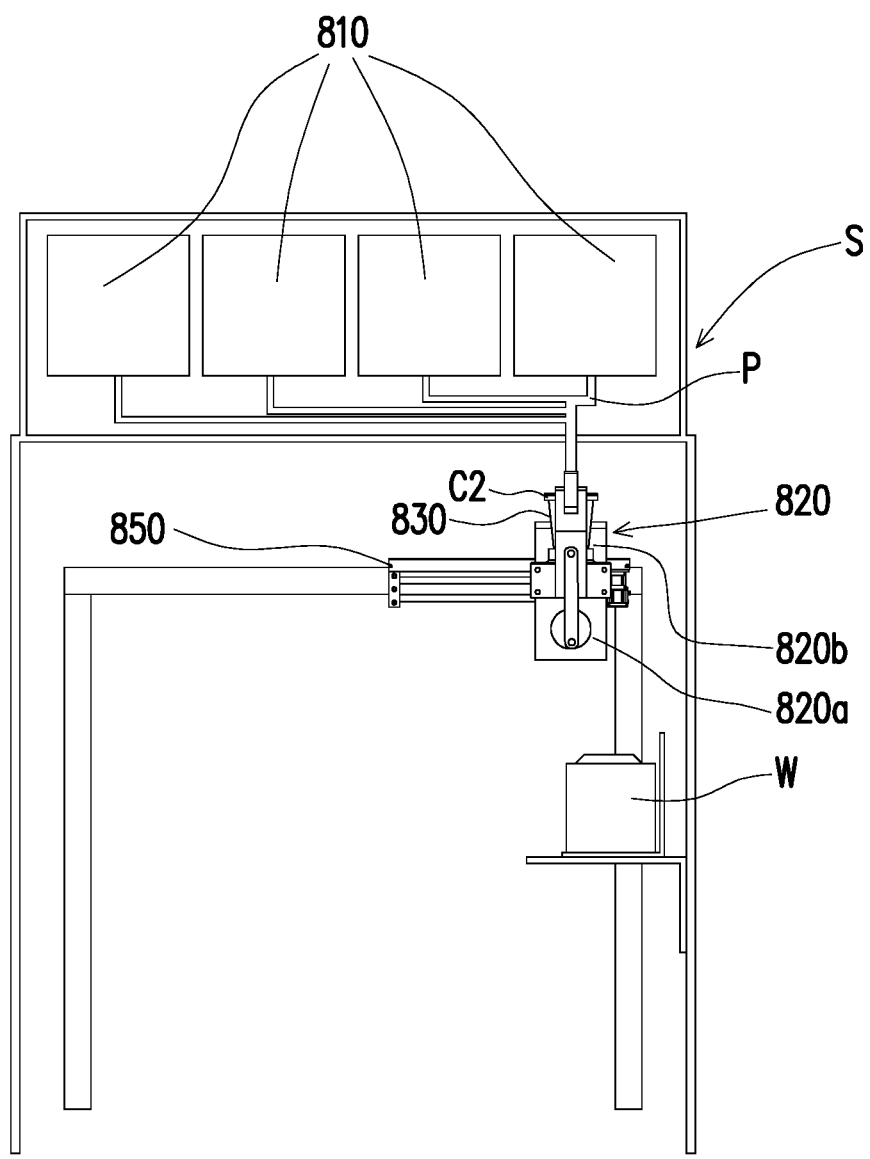
FIG. 16 is a schematic view of another embodiment of some components of the beverage brewing apparatus of FIG. 10.

FIG. 16 is a schematic view of another embodiment of some components of the beverage brewing apparatus of FIG. 10. Please refer to FIG. 16. In some components of the beverage brewing apparatus 800, the configuration and effects of the beverage brewing apparatus 800, the matching system S, the material storing device 810, the shake assembly 820a, the overturning assembly 820b, the brewing cup 830, the slide rail 850 are similar to those of FIG. 11, and shall not be repeated here. The difference between the embodiment illustrated in FIG. 16 and that illustrated in FIG. 15 is that, in this embodiment, the matching system S includes the conveying pipe P. The conveying pipe P is connected between the brewing cup 830 and the material storing unit 810. The materials from the material storing unit 810 are suitable for entering the brewing cup 830 through the conveying pipe P. The beverage brewing apparatus 800 conveys materials through the conveying pipe P, and simultaneously and indeed conveys materials to the brewing cup 830. In other embodiments, the conveying pipe P is connected between the brewing cup 830 and the material storing unit 810 through an injection assembly of an injection portion similar to the present application, and a plurality of the conveying pipes P are integrated into one conveying pipe P.

In this embodiment, the brewing cup and the brewing unit are integrated into one. Specifically, the brewing unit 820 includes the shake assembly 820a and the cup lid assembly C2, both of which are integrated with the brewing cup 830. In this way, the brewing unit 820 shakes the brewing cup 830 through the shake assembly 820a and covers the brewing cup 830 through the cup lid assembly C2, so that the materials in the brewing cup 830 are thoroughly mixed, at the same time, the materials are not leaked outside of the brewing cup 830. The assembly configuration of the beverage brewing apparatus 800 is more simplified.

Figure 17:
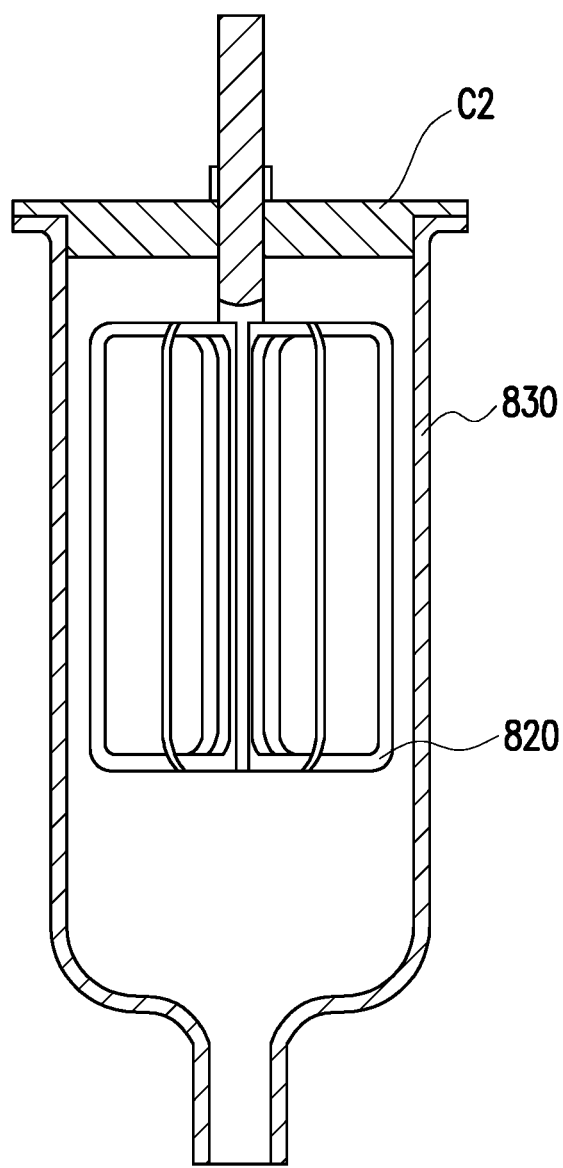
FIG. 17 is a schematic view of an integration of the brewing cup and the brewing unit of the beverage brewing apparatus of another embodiment of the invention.

FIG. 17 is a schematic view of an integration of the brewing cup and the brewing unit of the beverage brewing apparatus of another embodiment of the invention. Please refer to FIG. 17. The brewing unit 820 of this embodiment is a stirring assembly, which is integrated with the cup lid assembly C2 and is suitable for stirring the materials in the brewing cup 830. In this way, when materials completely enter the brewing cup 830 through the conveying pipe P, the materials in the brewing cup 830 are directly stirred by the stirring assembly. There is no need to open the cup lid assembly C2 to receive external brewing units to brew materials in the brewing cup 830 to lower the possible pollution from the outside. In other embodiments, the stirring assembly is a detachable assembly. The user is able to install it or not on the cup lid assembly C2 based on needs.

In this embodiment, the beverage brewing apparatus 800 includes a storing unit similar to the washing liquid storing unit of the present application. An external water source or other devices providing washing liquid is suitable for providing the washing liquid to the brewing cup 830, wherein after the brewing cup 830 pours the brewed materials into the beverage cup C5, washing liquid enters and washes the brewing cup 830. The washing methods are washing through the washing device W, powerful water column or activating the stirring assembly 820d to wash. After washing is completed, the brewing cup 830 pours washing liquid outside the brewing cup 830 by rotating the overturning assembly 820b.

Figure 18:
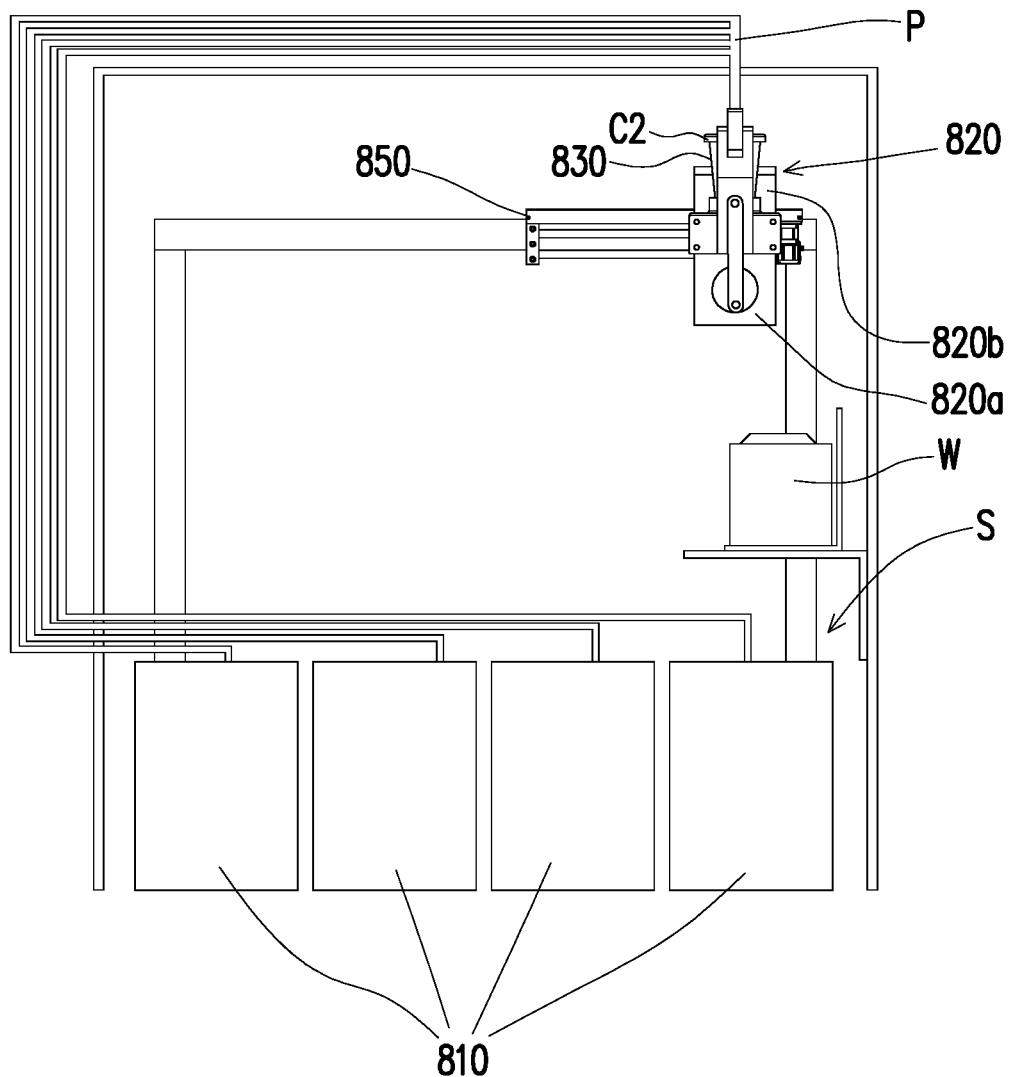
FIG. 18 is a schematic view of another embodiment of some components of the beverage brewing apparatus of FIG. 10.

FIG. 18 is a schematic view of another embodiment of some components of the beverage brewing apparatus of FIG. 10. Please refer to FIG. 18. In some components of the beverage brewing apparatus 800, the configuration and effects of the matching system S, the material storing device 810, the shake assembly 820a, the overturning assembly 820b, the brewing cup 830, the slide rail 850, the washing unit W and the cup lid assembly C2, are similar to those of FIG. 16, and shall not be repeated here. The difference between the embodiment illustrated in FIG. 17 and that illustrated in FIG. 16 is that, in this embodiment, the material storing unit 810 of some components of the beverage brewing apparatus 800 is disposed below the conveying device 860, and provides power to the materials by using a bump, so that the materials flow down to the brewing cup 830. The beverage brewing apparatus 800p provides the user with another choice for the configuration of the material storing unit 810, increasing user's flexibility for space utilization.

In summary of the above, the beverage brewing apparatus of the invention matches the material storing unit, the brewing unit and the movements of the brewing cup by the matching system, so as to automatically brew beverage for saving manpower and time. In addition, the beverage brewing apparatus could, based on the user's needs, adjusts the configuration of the material storing unit, the brewing unit and the brewing cup, and the assembly included within, for processing different brewing movements and adjusting the brewing order, so that the user has substantial flexibility while manipulating and disposing the beverage brewing apparatus. The beverage brewing apparatus is closer to the user's needs.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A beverage brewing apparatus, comprising:
   at least one material storing unit, suitable for storing materials;
   at least one brewing cup;
   a matching system, the matching system being suitable for matching the brewing cup and the material storing unit, so that the brewing cup is suitable for receiving the materials from the material storing unit;
   at least one brewing unit, suitable for brewing the materials in the brewing cup;
   at least one slide rail and a carrier, wherein the carrier is suitable for carrying a cup, the slide rail is suitable for driving the brewing unit to move, so that the brewing cup on the brewing unit reaches the carrier; and
   a preplaced material storing unit and a postplaced material storing unit, wherein the preplaced material storing unit and the postplaced material storing unit are disposed on the carrier and are suitable for storing preplaced materials and postplaced materials respectively, the cup is suitable for receiving the preplaced materials from the preplaced material storing unit, brewed materials from the brewing cup, and the postplaced materials from the postplaced material storing unit in sequence.

2. The beverage brewing apparatus according to claim 1, wherein the matching system is suitable for matching the brewing cup and the brewing unit, so that the brewing unit is suitable for brewing the materials in the brewing cup.

3. The beverage brewing apparatus according to claim 1, wherein the matching system comprises a rotary base, the material storing unit is disposed on the rotary base, and the rotary base is suitable for rotating to drive the material storing unit to be aligned with the brewing cup.

4. The beverage brewing apparatus according to claim 1, comprising an automatic cup placing unit, wherein the automatic cup placing unit is suitable for loading a plurality of the cups, and each of the cups is suitable for being placed on the carrier from the automatic cup placing unit.

5. The beverage brewing apparatus according to claim 1, wherein the brewing cup is disposed on the brewing unit.

6. The beverage brewing apparatus according to claim 1, wherein the brewing unit comprises a shake assembly, and the shake assembly is suitable for shaking the brewing cup.

7. The beverage brewing apparatus according to claim 1, wherein the brewing unit comprises a cup lid assembly, and the cup lid assembly is suitable for covering the brewing cup.

8. The beverage brewing apparatus according to claim 1, wherein the brewing unit comprises an overturning assembly, and the overturning assembly is suitable for overturning the brewing cup to pour the brewed materials in the brewing cup into the cup.

9. The beverage brewing apparatus according to claim 1, comprising at least one washing unit, wherein the brewing unit comprises an overturning assembly, the overturning assembly is suitable for overturning the brewing cup to the washing unit, and the washing unit is suitable for washing the brewing cup.

10. The beverage brewing apparatus according to claim 1, wherein the matching system comprises a conveying device, the conveying device is suitable for conveying the brewing cup, so that the brewing cup passes through the material storing unit.

11. The beverage brewing apparatus according to claim 10, wherein the conveying device is suitable for conveying the brewing cup, so that the brewing cup passes through the brewing unit.

12. The beverage brewing apparatus according to claim 10, comprising a carrying unit, wherein the carrying unit is suitable for carrying the brewing cup, the conveying device is suitable for conveying the carrying unit, so that the carrying unit passes through the material storing unit and the brewing unit.

13. The beverage brewing apparatus according to claim 12, wherein the carrying unit comprises a cup lid assembly, and the cup lid assembly is suitable for covering the brewing cup.

14. The beverage brewing apparatus according to claim 13, comprising an stirring assembly, wherein the stirring assembly is disposed on the cup lid assembly and is suitable for stirring the materials in the brewing cup.

15. The beverage brewing apparatus according to claim 12, comprising at least one stop assembly, wherein the stop assembly is movably disposed on the conveying path of the conveying device, and is suitable for stopping the carrying unit on the conveying path.

16. The beverage brewing apparatus according to claim 10, comprising a washing unit, wherein the conveying device is suitable for conveying the brewing cup, so that the brewing cup passes through the washing unit, and the washing unit is suitable for washing the brewing cup.

17. The beverage brewing apparatus according to claim 10, wherein the brewing unit comprises a gripper, the gripper is suitable for gripping the carrying unit away from the conveying device.

18. The beverage brewing apparatus according to claim 1, wherein the brewing unit comprises a stirring assembly, and the stirring assembly is suitable for stirring materials in the brewing cup.

19. The beverage brewing apparatus according to claim 1, wherein the brewing cup has an upper opening and a lower opening opposite to each other, and has an upper solenoid valve and a lower solenoid valve respectively located on the upper opening and the lower opening, when the upper solenoid valve is turned on and the lower solenoid valve is turned off, the brewing cup is suitable for receiving the materials from the material storing unit through the upper solenoid valve, and when the upper solenoid valve is turned off and the lower solenoid valve is turned on, the brewing cup is suitable for pouring the brewed materials into the cup through the lower opening.

20. The beverage brewing apparatus according to claim 19, comprising a washing liquid storing unit, wherein the washing liquid storing unit is suitable for storing washing liquid, when the upper solenoid valve is turned on and the lower solenoid valve is turned on, the washing liquid from the washing liquid storing unit enters the brewing cup through the upper opening and leaves the brewing cup through the lower opening.

21. The beverage brewing apparatus according to claim 20, comprising a conveying pipe and an injection portion, wherein the conveying pipe is connected between the brewing cup and the injection portion, and the washing liquid from the washing liquid storing unit is suitable for entering the brewing cup through the injection portion and the conveying pipe in sequence.

22. The beverage brewing apparatus according to claim 1, comprising a conveying pipe and an injection portion, wherein the conveying pipe is connected between the brewing cup and the injection portion, and the materials from the material storing unit are suitable for entering the brewing cup through the injection portion and the conveying pipe in sequence.

23. The beverage brewing apparatus according to claim 1, comprising
  a conveying device, wherein the conveying device is suitable for conveying the cup, so that the cup passes through the preplaced material storing unit, the brewing cup and the postplaced material storing unit in sequence, and the cup is suitable for receiving the preplaced materials from the preplaced material storing unit, the brewed materials from the brewing cup, and the postplaced materials from the postplaced material storing unit in sequence.

24. The beverage brewing apparatus according to claim 23, comprising an automatic cup placing unit, wherein the automatic cup placing unit is suitable for loading a plurality of the cups, and each of the cups is suitable for being placed on the conveying device from the automatic cup placing unit.

25. The beverage brewing apparatus according to claim 23, comprising at least one stop assembly, wherein the stop assembly is movably disposed on the conveying path on the conveying device, and is suitable for stopping the cup on the conveying path.

26. The beverage brewing apparatus according to claim 23, comprising a sealing unit, wherein the conveying device is suitable for conveying the cup from the postplaced material storing unit to the sealing unit, and the sealing unit is suitable for sealing the cup.

27. The beverage brewing apparatus according to claim 1, wherein the matching system comprises at least one conveying pipe, the conveying pipe is connected between the material storing unit and the brewing cup, and the materials in the material storing unit are suitable for reaching the brewing cup through the conveying pipe.

28. The beverage brewing apparatus according to claim 1, wherein the material storing unit is located above the brewing cup or below the brewing cup.

29. The beverage brewing apparatus according to claim 1, wherein the brewing unit is integrated with the brewing cup.

30. A beverage brewing apparatus, comprising:
  at least one material storing unit, suitable for storing materials;

at least one brewing cup;
a matching system, the matching system being suitable for matching the brewing cup and the material storing unit, so that the brewing cup is suitable for receiving the materials from the material storing unit;
at least one brewing unit, suitable for brewing the materials in the brewing cup; and
a preplaced material storing unit, a postplaced material storing unit and a conveying device, wherein the conveying device is suitable for conveying a cup, so that the cup passes through the preplaced material storing unit, the brewing cup and the postplaced material storing unit in sequence, and the cup is suitable for receiving preplaced materials from the preplaced material storing unit, brewed materials from the brewing cup, and postplaced materials from the postplaced material storing unit in sequence.

31. A beverage brewing apparatus, comprising:
at least one material storing unit, suitable for storing materials;
at least one brewing cup;
a matching system, the matching system being suitable for matching the brewing cup and the material storing unit, so that the brewing cup is suitable for receiving the materials from the material storing unit;
at least one brewing unit, suitable for brewing the materials in the brewing cup; and
a preplaced material storing unit or a postplaced material storing unit, wherein the preplaced material storing unit is suitable for storing preplaced materials, a cup is suitable for, before receiving brewed materials from the brewing cup, receiving the preplaced materials from the preplaced material storing unit, the postplaced material storing unit is suitable for storing postplaced materials, the cup is suitable for, after receiving the brewed materials from the brewing cup, receiving the postplaced materials from the postplaced material storing unit.

* * * * *